US012763484B2

(12) United States Patent
Muhammad Idban et al.

(10) Patent No.: US 12,763,484 B2
(45) Date of Patent: Oct. 13, 2026

(54) SYSTEMS AND METHODS FOR DETECTING ANGLE OF ARRIVAL ON A HYBRID RECONFIGURABLE INTELLIGENT SURFACE USING INTENSITY ONLY DATA

(71) Applicants: Abu Huraira Muhammad Idban, Tempe, AZ (US); Seyedmohammadreza Faghih Imani, Phoenix, AZ (US)

(72) Inventors: Abu Huraira Muhammad Idban, Tempe, AZ (US); Seyedmohammadreza Faghih Imani, Phoenix, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 210 days.

(21) Appl. No.: 18/660,511

(22) Filed: May 10, 2024

(65) Prior Publication Data

US 2025/0293436 A1 Sep. 18, 2025

Related U.S. Application Data

(60) Provisional application No. 63/501,166, filed on May 10, 2023.

(51) Int. Cl.

*H01Q 15/00* (2006.01)
*G02B 1/00* (2006.01)
*H04B 17/20* (2015.01)

(52) U.S. Cl.

CPC ......... *H01Q 15/0086* (2013.01); *G02B 1/002* (2013.01); *H01Q 15/002* (2013.01); *H04B 17/202* (2023.05)

(58) Field of Classification Search

CPC .. H01Q 15/0086; H01Q 15/002; G02B 1/002; H04B 17/202

See application file for complete search history.

(56) References Cited

U.S. PATENT DOCUMENTS 8,340,588 B2 * 12/2012 Nielsen ................ H04B 7/0891 455/271
2017/0317726 A1 * 11/2017 Abdallah ............ H04B 7/0452

(Continued)

FOREIGN PATENT DOCUMENTS

CN 113078476 A * 7/2021 ............... H01Q 1/48

OTHER PUBLICATIONS

Alamzadeh, I., Alexandropoulos, G.C., Shlezinger, N et al. A reconfigurable intelligent surface with integrated sensing capability. Sci Rep 11, 20737 (2021). https://doi.org/10.1038/s41598-021-99722-x (Year: 2021).*

(Continued)

*Primary Examiner* — Dameon E Levi
*Assistant Examiner* — Jose A. Miranda Gonzalez
(74) *Attorney, Agent, or Firm* — Riverside Law LLP

(57) ABSTRACT

A system for detecting angle of arrival comprises an array of metamaterial or resonant elements that share a dielectric substrate and a metallic ground layer, wherein each of the metamaterial or resonant elements includes a switchable component; an opening in the ground layer configured to couple an incident wave signal; and a waveguide below the ground layer configured to guide the coupled signal to a receiving circuit including an intensity or power meter. A method for detecting angle of arrival comprises providing the system as described above; coupling an incident wave signal to the shared substrate; guiding the coupled signal from the shared substrate to the receiving circuit via the waveguide; measuring the coupled signal via intensity or (Continued)

power meter of the receiving circuit; and calculating an angle of arrival based on the measured intensity or power.

20 Claims, 15 Drawing Sheets

(56) References Cited

U.S. PATENT DOCUMENTS

| | | | | |
|---|---|---|---|---|
| 2020/0205011 | A1* | 6/2020 | Tomic | H04B 17/27 |
| 2024/0004017 | A1* | 1/2024 | Dhouibi | H01Q 1/48 |
| 2025/0385715 | A1* | 12/2025 | Huang | H04B 7/04013 |
| 2026/0016590 | A1* | 1/2026 | Hewett | G01S 13/751 |

OTHER PUBLICATIONS

A. Araghi, M. Khalily, M. Safaei, A. Bagheri, V. Singh, F. Wang, and R. Tafazolli, "Reconfigurable intelligent surface (RIS) in the sub-6 gHz band: Design, implementation, and real-world demonstration," IEEE Access, vol. 10, pp. 2646-2655, 2022.

A. V. Diebold, M. F. Imani, T. Sleasman, and D. R. Smith, "Phaseless coherent and incoherent microwave ghost imaging with dynamic metasurface apertures," Optica, vol. 5, No. 12, pp. 1529-1541, 2018.

A. V. Diebold, M. F. Imani, T. Sleasman, and D. R. Smith, "Phaseless computational ghost imaging at microwave frequencies using a dynamic metasurface aperture," Appl. Opt., vol. 57, No. 9, pp. 2142-2149, Mar. 2018.

B. Fuchs and L. Le Coq, "Excitation retrieval of microwave linear arrays from phaseless far-field data," IEEE Transactions on Antennas and Propagation, vol. 63, No. 2, pp. 748-754, 2014.

C. Liaskos, G. Pyrialakos, A. Pitilakis, S. Abadal, A. Tsioliaridou, A. Tasolamprou, O. Tsilipakos, N. Kantartzis, S. Ioannidis, E. Alarcon et al., "Absense: Sensing electromagnetic waves on metasurfaces via ambient compilation of full absorption," in Proceedings of the Sixth Annual ACM International Conference on Nanoscale Computing and Communication, 2019, pp. 1-6.

C. Pan, H. Ren, K. Wang, J. F. Kolb, M. Elkashlan, M. Chen, M. Di Renzo, Y. Hao, J. Wang, A. L. Swindlehurst et al., "Reconfigurable intelligent surfaces for 6g systems: Principles, applications, and research directions," IEEE Communications Magazine, vol. 59, No. 6, pp. 14-20, 2021.

D. Sievenpiper, L. Zhang, R. F. Broas, N. G. Alexopolous, and E. Yablonovitch, "High-impedance electromagnetic surfaces with a forbidden frequency band," IEEE Transactions on Microwave Theory and techniques, vol. 47, No. 11, pp. 2059-2074, 1999.

E. Basar, M. Di Renzo, J. De Rosny, M. Debbah, M.-S. Alouini, and R. Zhang, "Wireless communications through reconfigurable intelligent surfaces," IEEE access, vol. 7, pp. 116753-116773, 2019.

E. Bjornson," O." Ozdogan, and E. G. Larsson, "Intelligent reflecting" surface versus decode-and-forward: How large surfaces are needed to beat relaying? IEEE Wireless Communications Letters, vol. 9, No. 2, pp. 244-248, 2019.

E. J. Candes, X. Li, and M. Soltanolkotabi, "Phase retrieval via wirtinger flow: Theory and algorithms," IEEE Transactions on Information Theory, vol. 61, No. 4, pp. 1985-2007, 2015.

G. C. Alexandropoulos, N. Shlezinger, I. Alamzadeh, M. F. Imani, H. Zhang, and Y. C. Eldar, "Hybrid reconfigurable intelligent metasurfaces: Enabling simultaneous tunable reflections and sensing for 6g wireless communications," arXiv preprint arXiv:2104.04690, 2021.

G. C. Trichopoulos, P. Theofanopoulos, B. Kashyap, A. Shekhawat, A. Modi, T. Osman, S. Kumar, A. Sengar, A. Chang, and A. Alkhateeb, "Design and evaluation of reconfigurable intelligent surfaces in realworld environment," IEEE Open Journal of the Communications Society, vol. 3, pp. 462-474, 2022.

G. Lerosey and M. Fink, "Wavefront shaping for wireless communications in complex media: From time reversal to reconfigurable intelligent surfaces," Proceedings of the IEEE, vol. 110, No. 9, pp. 1210-1226, 2022.

H. Zhang, N. Shlezinger, F. Guidi, D. Dardari, M. F. Imani, and Y. C. Eldar, "Beam focusing for near-field multi-user mimo communications," IEEE Transactions on Wireless Communications, 2022.

H. Zhang, N. Shlezinger, G. C. Alexandropoulos, I. Alamzadeh, M. F. Imani, and Y. C. Eldar, "Channel estimation with hybrid reconfigurable intelligent metasurfaces," arXiv preprint arXiv:2206.03913, 2022.

I. Alamzadeh and M. F. Imani, "Detecting Angle of Arrival on a Hybrid RIS Using Intensity-Only Data," in IEEE Antennas and Wireless Propagation Letters, vol. 22, No. 9, pp. 2325-2329, Sep. 2023, doi: 10.1109/LAWP.2023.3288123.

I. Alamzadeh and M. F. Imani, "Sensing and reconfigurable reflection of electromagnetic waves from a metasurface with sparse sensing elements," IEEE Access, vol. 10, pp. 105954-105965, 2022.

I. Alamzadeh, G. C. Alexandropoulos, N. Shlezinger, and M. F. Imani, "A reconfigurable intelligent surface with integrated sensing capability," Scientific reports, vol. 11, No. 1, pp. 1-10, 2021.

J. He, A. Fakhreddine, and G. C. Alexandropoulos, "Joint channel and direction estimation for ground-to-uav communications enabled by a simultaneous reflecting and sensing ris," arXiv preprint arXiv:2210.15238, 2022.

J. Laviada, A. Arboleya-Arboleya, Y. Alvarez-Lopez, C. GarciaGonzalez, and F. Las-Heras, "Phaseless synthetic aperture radar with efficient sampling for broadband near-field imaging: Theory and validation," IEEE Transactions on Antennas and Propagation, vol. 63, No. 2, pp. 573-584, 2014.

J. Y. Dai, W. Tang, M. Wang, M. Z. Chen, Q. Cheng, S. Jin, T. J. Cui, and C. H. Chan, "Simultaneous in-situ direction finding and field manipulation based on space-time-coding digital metasurface," IEEE Transactions on Antennas and Propagation, 2022.

J.-B. Gros, V. Popov, M. A. Odit, V. Lenets, and G. Lerosey, "A reconfigurable intelligent surface at mmwave based on a binary phase tunable metasurface," IEEE Open Journal of the Communications Society, vol. 2, pp. 1055-1064, 2021.

L. Wei, C. Huang, Q. Guo, Z. Yang, Z. Zhang, G. C. Alexandropoulos, M. Debbah, and C. Yuen, "Joint channel estimation and signal recovery for ris-empowered multi-user communications," IEEE Transactions on Communications, 2022.

M. A. ElMossallamy, H. Zhang, L. Song, K. G. Seddik, Z. Han, and G. Y. Li, "Reconfigurable intelligent surfaces for wireless communications: Principles, challenges, and opportunities," IEEE Transactions on Cognitive Communications and Networking, vol. 6, No. 3, pp. 990-1002, 2020.

M. D. Renzo, M. Debbah, D.-T. Phan-Huy, A. Zappone, M.-S. Alouini, C. Yuen, V. Sciancalepore, G. C. Alexandropoulos, J. Hoydis, H. Gacanin et al., "Smart radio environments empowered by reconfigurable ai meta-surfaces: An idea whose time has come," EURASIP Journal on Wireless Communications and Networking, vol. 2019, No. 1, pp. 1-20, 2019.

M. Di Renzo, A. Zappone, M. Debbah, M.-S. Alouini, C. Yuen, J. De Rosny, and S. Tretyakov, "Smart radio environments empowered by reconfigurable intelligent surfaces: How it works, state of research, and the road ahead," IEEE journal on selected areas in communications, vol. 38, No. 11, pp. 2450-2525, 2020.

M. F. Imani, S. Abadal, and P. Del Hougne, "Metasurface-programmable wireless network-on-chip," Advanced Science, vol. 9, No. 26, p. 2201458, 2022.

N. Kaina, M. Dupre, G. Lerosey, and M. Fink, "Shaping complex microwave fields in reverberating media with binary tunable metasurfaces," Scientific reports, vol. 4, No. 1, pp. 1-8, 2014.

N. Viswanathan, S. Venkatesh, and D. Schurig, "Optimization of a sparse aperture configuration for millimeter-wave computational imaging," IEEE Trans. Antennas Propag., vol. 69, No. 2, pp. 1107-1117, Feb. 2021.

O. Yurduseven, T. Fromenteze, D. L. Marks, J. N. Gollub, and D. R. Smith, "Frequency-diverse computational microwave phaseless imaging," IEEE Antennas and Wireless Propagation Letters, vol. 16, pp. 2808-2811, 2017.

P. D. Hougne, M. F. Imani, A. V. Diebold, R. Horstmeyer, and D. R. Smith, "Learned integrated sensing pipeline: Reconfigurable metasurface transceivers as trainable physical layer in an artificial neural network," Adv. Sci., vol. 7, No. 3, 2020, Art. No. 1901913.

(56) References Cited

OTHER PUBLICATIONS

P. Del Hougne, M. Fink, and G. Lerosey, "Optimally diverse communication channels in disordered environments with tuned randomness," Nature Electronics, vol. 2, No. 1, pp. 36-41, 2019.
P. Zivuku, S. Kisseleff, V.-D. Nguyen, K. Ntontin, W. A. Martins, S. Chatzinotas, and B. Ottersten, "Maximizing the number of served users in a smart city using reconfigurable intelligent surfaces," in 2022 IEEE Wireless Communications and Networking Conference (WCNC). IEEE, 2022, pp. 494-499.
Q. Ma, Q. R. Hong, X. X. Gao, H. B. Jing, C. Liu, G. D. Bai, Q. Cheng, and T. J. Cui, "Smart sensing metasurface with self-defined functions in dual polarizations," Nanophotonics, vol. 9, No. 10, pp. 3271-3278, 2020.
Q. Wu, S. Zhang, B. Zheng, C. You, and R. Zhang, "Intelligent reflecting surface-aided wireless communications: A tutorial," IEEE Transactions on Communications, vol. 69, No. 5, pp. 3313-3351, 2021.
Q. Y. Zhou, J. W. Wu, S. R. Wang, Z. Q. Fang, L. J. Wu, J. C. Ke, J. Y. Dai, T. J. Cui, and Q. Cheng, "Two-dimensional direction-of-arrival estimation based on time-domain-coding digital metasurface," Applied Physics Letters, vol. 121, No. 18, p. 181702, 2022.
R. Ghazalian, H. Chen, G. C. Alexandropoulos, G. Seco-Granados, H. Wymeersch, and R. Jantti, "Joint user localization and location" calibration of a hybrid reconfigurable intelligent surface, arXiv preprint arXiv:2210.10150, 2022.
T. Fromenteze, O. Yurduseven, P. D. Hougne, and D. R. Smith, "Lowering latency and processing burden in computational imaging through dimensionality reduction of the sensing matrix," Sci. Rep., vol. 11, No. 1, 2021, Art. No. 3545.
Z.-Q. He and X. Yuan, "Cascaded channel estimation for large intelligent metasurface assisted massive mimo," IEEE Wireless Communications Letters, vol. 9, No. 2, pp. 210-214, 2019.

* cited by examiner

SYSTEMS AND METHODS FOR DETECTING ANGLE OF ARRIVAL ON A HYBRID RECONFIGURABLE INTELLIGENT SURFACE USING INTENSITY ONLY DATA

CROSS-REFERENCE TO RELATED APPLICATIONS

This application claims priority to U.S. provisional application No. 63/501,166 filed on May 10, 2023, incorporated herein by reference in its entirety.

STATEMENT REGARDING FEDERALLY SPONSORED RESEARCH OR DEVELOPMENT

This invention was made with government support under 2030068 awarded by the National Science Foundation. The government has certain rights in the invention.

BACKGROUND OF THE INVENTION

Many navigation systems rely on detecting angle of arrival (AoA) to acquire desired coordinates. A variety of radar systems deploy AoA detection to deliver the desired information about the surrounding or target of interest. Modern radio environments rely on adaptive beamforming techniques to direct electromagnetic waves toward intended directions. Therefore, the knowledge of the direction of desired transmitters/receivers is a crucial aspect in such adaptive beamforming applications. Conventional AoA estimation utilizes the phase or time delay of the received signal. In essence, these AoA estimation protocols are based on the reception of amplitude and phase (or time delay) of the return signals. However, the detection of complex signals requires complicated circuitry making the radio device bulky and expensive. The complexity of AoA detection can be significantly reduced if the AoA can be estimated using only the intensity (or strength) of the incoming signal. In other words, replacing traditional AoA detection mechanisms with an intensity only AoA detection approach will reduce the implementation cost and computational complexity. Moreover, the spatial/angular resolution of detecting AoA is linearly proportional to the aperture size. In conventional implementations, increasing the aperture size may necessitate using more receivers to obtain the required spatial resolution. It is thus desirable to achieve high spatial/angular resolution while keeping the number of receivers at a minimum.

Adaptive wireless propagation environments empowered by reconfigurable intelligent surfaces (RIS) have garnered much interest recently. (E. Basar, et al., *IEEE access,* 2019.) (C. Pan, et al., *IEEE Communications Magazine,* 2021.) (M. D. Renzo et al., *EURASIP Journal on Wireless Communications and Networking,* 2019.) (M. Di Renzo, et al., *IEEE journal on selected areas in communications,* 2020.) (Q. Wu, et al., *IEEE Transactions on Communications,* 2021.) (E. Bjornson, et al., *IEEE Wireless Communications Letters,* 2019.) In these so-called smart radio environments, RISs redirect signals toward desired directions or realize over the air equalization. (N. Kaina, et al., *Scientific reports,* 2014.) (P. Zivuku, et al., 2022 *IEEE Wireless Communications and Networking Conference* (*WCNC*). IEEE, 2022.) (M. F. Imani, et al., *Advanced Science,* 2022.) (A. Araghi, et al., *IEEE Access,* 2022.) (M. A. El Mossallamy, et al., *IEEE Transactions on Cognitive Communications and Networking,* 2020.) (H. Zhang, et al., *IEEE Transactions on Wireless Communications,* 2022.) (P. Del Hougne, et al., *Nature Electronics,* 2019.) (G. Lerosey, et al., *Proceedings of the IEEE,* 2022.) (J.-B. Gros, et al., *IEEE Open Journal of the Communications Society,* 2021.) (G. C. Trichopoulos, et al., *IEEE Open Journal of the Communications Society,* 2022.) The RIS's promising attributes, however, strongly depend on the knowledge about the propagation environment such as the incident signal's direction or intended reflection angle. Since RISs are ideally designed to reflect the signal and not sense it, obtaining necessary information about the channel at the RIS elements has become a challenge.

Over the years, several works have proposed solutions to this problem. A common approach is to use joint channel estimation using the information about the cascaded channel. (Z.-Q. He, et al., *IEEE Wireless Communications Letters,* 2019.) (L. Wei, et al., *IEEE Transactions on Communications,* 2022) This method, however, is computationally expensive since it aims to estimate separate channels from jointly sensed data. To overcome that, some have suggested introducing dedicated sensing elements to the RIS along with compressive sensing. (Q. Ma, et al., *Nanophotonics,* 2020.) Dedicated antennas attached to a receiver would reduce the effective reflective aperture of the RIS and may disrupt the phase profile needed for forming desired reflection patterns. Alternatively, a novel RIS was proposed by Liaskos that can switch to an absorption mode whereby comparing the received power in the absorption mode with an extensive look-up table for all possible angles of arrival the incident angle can be found. (C. Liaskos, et al., *Proceedings of the Sixth Annual ACM International Conference on Nanoscale Computing and Communication,* 2019.) Another method is to use angle of arrival (AoA) dependent frequency shift in time modulated RISs. (J. Y. Dai, et al., *IEEE Transactions on Antennas and Propagation,* 2022.) Similarly, estimation of signal direction has been demonstrated by applying time-domain orthogonal codes to the signals being incident on the metasurface. (Q. Y. Zhou, et al., *Applied Physics Letters,* 2022.) These approaches, however, require complicated metasurface designs and a dedicated receiving antenna connected to a receiver near the RIS. Alternatively, it is possible to use RISs that include hybrid meta-atoms: elements that can reflect the signal while also sense a portion of the incident signal. (I. Alamzadeh, et al., *Scientific reports,* 2021.) (G. C. Alexandropoulos, et al., *arXiv preprint,* 2021.) (H. Zhang, et al., *arXiv preprint,* 2022.) (J. He, et al., *arXiv preprint,* 2022.) (R. Ghazalian, et al., *arXiv preprint,* 2022.) (I. Alamzadeh, et al., *IEEE Access,* 2022) In particular, Alamzadeh et al. has shown that using only a few such hybrid elements is enough to retrieve desired information about the channel. To do that, they used the RIS in a novel manner where it realizes random multiplexing of the incident signal. This randomly multiplexed signal carries information about signal incidents on all elements, even if only a few receivers were used. By demultiplexing the signal collected in this manner, the desired features of the incident signal can be retrieved.

While a recently proposed approach, known as Ab-sense, technically operates on intensity-only data, it relies on a complicated and lengthy process of matching the surface impedance to that of the incident wave through extensive searches among many impedance profiles. In addition, accurate impedance matching in this manner requires the surface to switch to the absorption mode.

Thus there is a need in the art for a simplified approach for finding AoA via intensity only measurement.

SUMMARY OF THE INVENTION

Some embodiments of the invention disclosed herein are set forth below, and any combination of these embodiments (or portions thereof) may be made to define another embodiment.

In one aspect, a system for detecting angle of arrival comprises an array of metamaterial or resonant elements that share a dielectric substrate and a metallic ground layer, wherein each of the metamaterial or resonant elements includes a switchable component; an opening in the ground layer configured to couple an incident wave signal; and a waveguide below the ground layer configured to guide the coupled signal to a receiving circuit including an intensity or power meter.

In one embodiment, the system further comprises a computing system communicatively connected to the receiving circuit and the array of metamaterial or resonant elements, comprising a processor and a non-transitory computer-readable medium with instructions stored thereon, which when executed by the processor, perform steps comprising: receiving a measured intensity or power of the coupled signal from the receiving circuit; and calculating an angle of arrival based on the measured intensity or power.

In one embodiment, the computing system is further communicatively connected to the array of metamaterial or resonant elements, and wherein the processor is configured to perform steps stored on the computer-readable medium comprising addressing the array of metamaterial or resonant elements.

In one embodiment, the system is configured as a reconfigurable intelligent surface.

In one embodiment, the switchable component is configured to be addressed independently and configured to change its effective response.

In one embodiment, the waveguide comprises a substrate integrated waveguide.

In one embodiment, the switchable components comprise at least one of varactor diodes, PIN diodes, Schottky diodes, transistors, MEMS switches, phase change materials, liquid crystals.

In one embodiment, the system is configured to operate over a narrowband or single frequency.

In another aspect, a method for detecting angle of arrival comprises: providing the system as described above; coupling an incident wave signal to the shared substrate; guiding the coupled signal from the shared substrate to the receiving circuit via the waveguide; measuring the coupled signal via the intensity or power meter of the receiving circuit; and calculating an angle of arrival based on the measured intensity or power.

In one embodiment, the incident wave is coupled to the shared substrate via an opening inside the ground layer.

In one embodiment, the incident wave is coupled from the shared substrate via an opening inside the ground layer to the waveguide.

In one embodiment, the method further comprises addressing the metamaterial or resonant elements of the array to exhibit a random response.

In one embodiment, the coupled signal comprises a randomly multiplexed version of the incident signal.

In one embodiment, the method further comprises applying one or more multiplexing weights to the array of metamaterial or resonant elements.

In one embodiment, the one or more multiplexing weights are applied via setting the switchable components randomly In one embodiment, a multiplexing weight comprises a mask.

In one embodiment, the mask comprises a binary mask configured to switch each switchable element to one of two different capacitive states.

In one embodiment, a plurality of measurements of the coupled signal are performed before any substantial change to the environment occurs.

In one embodiment, the signal within the waveguide comprises a random weighted sum of signals incident on all elements.

In another aspect, a method to detect angle of arrival via intensity only data comprises: applying a randomized mask to a reconfigurable intelligent surface; receiving an incident wave signal on the reconfigurable intelligent surface, wherein the received signal is weighted based on the applied randomized mask; measuring an intensity of the weighted signal; and calculating an angle of arrival based on the measured intensity.

In one embodiment, the randomized mask is applied to the reconfigurable intelligent surface via setting a plurality of switchable components of the reconfigurable intelligent surface.

In one embodiment, the randomized mask comprises a binary mask where each switchable element is set to one of two different capacitive states.

BRIEF DESCRIPTION OF THE DRAWINGS

The foregoing purposes and features, as well as other purposes and features, will become apparent with reference to the description and accompanying figures below, which are included to provide an understanding of the invention and constitute a part of the specification, in which like numerals represent like elements, and in which.

DETAILED DESCRIPTION OF THE INVENTION

Figure 1A:
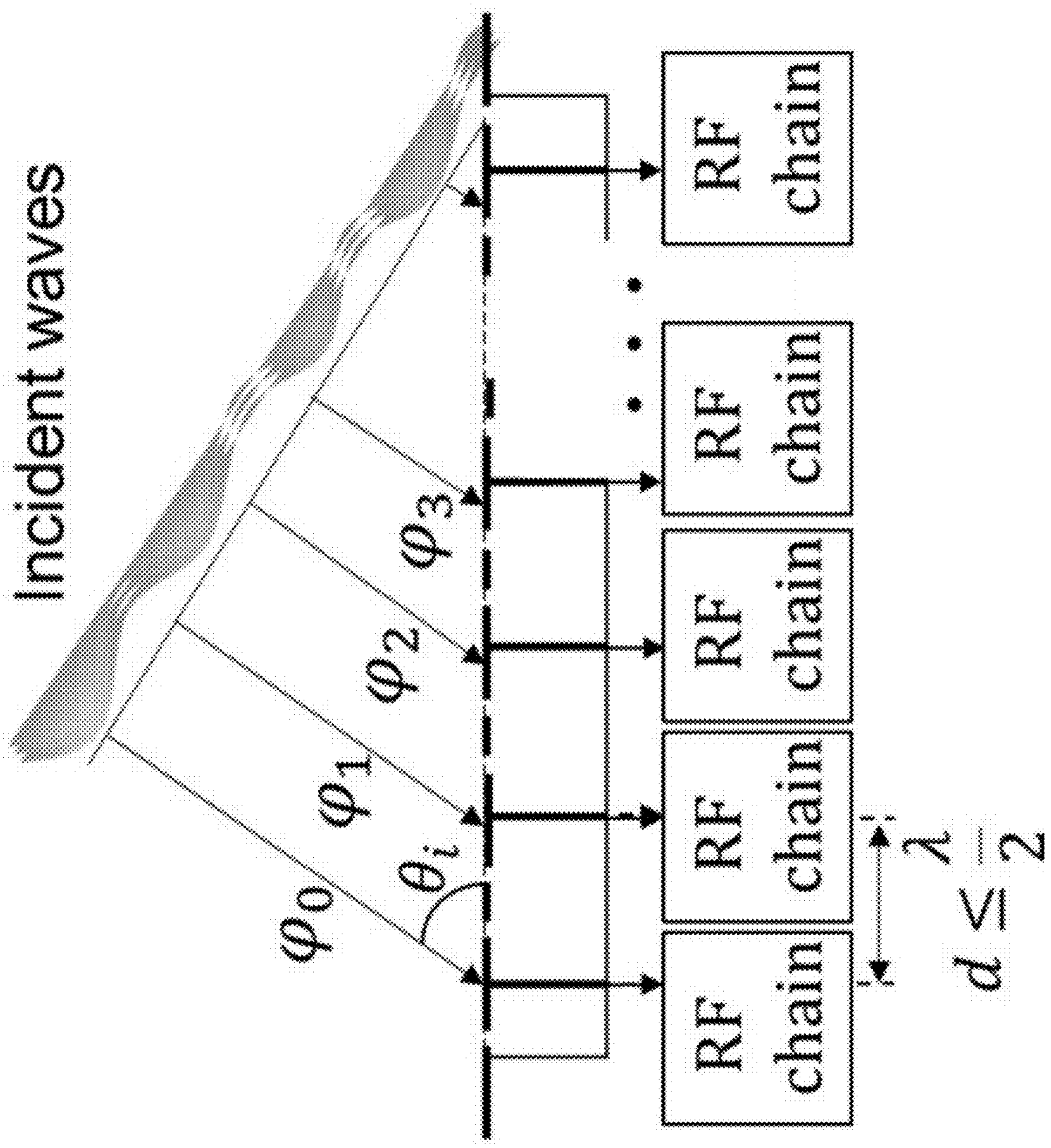
FIGS. 1A-1B are a comparative depiction of a conventional sensing mechanism (FIG. 1A) and a sparse sensing mechanism for an RIS (FIG. 1B) in accordance with some embodiments.

It is to be understood that the figures and descriptions of the present invention have been simplified to illustrate elements that are relevant for a clearer comprehension of the present invention, while eliminating, for the purpose of clarity, many other elements found in systems and methods of detecting angle of arrival on a hybrid reconfigurable intelligent surface using intensity only data. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, exemplary methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20%, ±10%, ±5%, ±1%, and ±0.1% from the specified value, as such variations are appropriate.

Ranges: throughout this disclosure, various aspects of the invention can be presented in a range format. It should be understood that the description in range format is merely for convenience and brevity and should not be construed as an inflexible limitation on the scope of the invention. Where appropriate, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Referring now in detail to the drawings, in which like reference numerals indicate like parts or elements throughout the several views, in various embodiments, presented herein are systems and methods for detecting angle of arrival on a hybrid reconfigurable intelligent surface using intensity only data.

All prior methods discussed above require conventional sensing of complex data to deduce the information about the incoming waves. Detecting complex signals (i.e amplitudes and phases) necessitates complicated circuitry. If instead, intensity-only data can be used for retrieving desired characteristics about the environment, the complexity of the receiving circuitry at the RIS can be substantially reduced. While Ab-sense RIS (Liaskos et al. 2019) can technically work on intensity-only data, it requires a complicated search among many impedance profiles of the RIS to match the incident signal impedance. Disclosed herein is a sensing protocol that does not require a complicated dictionary look up process.

Toward this goal, inspiration was taken from intensity-only computational microwave imaging which has received a lot of attention over the last decade. (J. Laviada, et al., *IEEE Transactions on Antennas and Propagation,* 2014.) (O. Yurduseven, et al., *IEEE Antennas and Wireless Propagation Letters,* 2017.) (A. V. Diebold, et al., *Optica,* 2018.) (A. V. Diebold, et al., *Appl. Opt., March* 2018) In particular, the computational ghost imaging technique or coincidence imaging has recently been applied to intensity-only measurements to recover reflection patterns of a region of interest. (Diebold et al. 2018) The underlying idea in these works is to use a dynamic metasurface antenna (DMA) that can generate a series of pre-characterized spatially diverse patterns illuminating a scene of interest. By correlating the intensity of the return signal with that of the illuminating patterns, one can deduce the location of targets in the scene with the goal of leveraging the ghost imaging principle to estimate the angle of arrival on a RIS.

The described intensity only AoA detection is unique and is in contrast to conventional AoA estimation schemes where complicated circuitry for complex signal detection is used for the estimation. The intensity only signal detection approach does not require phase measurement or large bandwidth, and can operate with a single receiver while guaranteeing desired angular resolution.

The disclosed systems and methods are based on intensity-only computational microwave imaging that is used in imaging to recover reflectivity maps of a region of interest. The underlying idea in these imaging works is to use a dynamic metasurface antenna (DMA) that can generate a series of pre-characterized spatially diverse patterns illuminating a scene of interest. By correlating the intensity of the return signal with that of the illuminating patterns, one can deduce the location of targets in the scene. Hence, in imaging, the transmitted signal is known to the sensor and the diverse transmitted signal is used to capture the reflectivity map of the target. Unlike imaging, the disclosed systems and methods utilize an intensity-only sensing mechanism for wireless systems where the device may not be equipped with a transmitter and thus the sensing module can operate using signals of opportunity or in a passive manner. Another distinction is that the system detects AoA while previous works intend to image reflectivity maps in the close distance from the setup. Therefore, in one aspect the novelty of the disclosed systems and methods lies both in the sensing modality and the parameter to be estimated. In the context of reconfigurable intelligent surfaces, the described exemplary configuration simplifies deployment requirements of RISs in practical wireless systems eliminating the need for complicated circuitry for complex signal detection or complicated signal processing for channel estimation. Further details can be found in I. Alamzadeh and M. F. Imani ("Detecting Angle of Arrival on a Hybrid RIS Using Intensity-Only Data," in IEEE Antennas and Wireless Propagation Letters, vol. 22, no. 9, pp. 2325-2329 September 2023), which is incorporated herein by reference in its entirety.

Disclosed herein in one aspect is a compressive sensing architecture to sense the incoming signal from only two sensing elements. The intensity of the difference of the signal captured by each of these elements is used for sensing purposes, eliminating the need for phase detection altogether. The computational ghost imaging method is then recast to be used for analyzing this data to derive the direction of arrival. Using a full-wave simulation, and as shown below, the disclosed intensity-only sensing operation can be used to detect the AoA of an incoming signal in free space.

In some embodiments, the device requires using only a single receiver that detects intensity to retrieve desired characteristics of the incident signal with high angular resolution. The device can operate over a narrowband (down to a single frequency) without any degradation to the operation. These capabilities are unique among devices designed for AoA detection. The disclosed sensing mechanism can operate without the iterative long impedance matching process, and it doesn't require switching to the absorption mode. When the disclosed system is used as a reconfigurable intelligent surface (RIS) to implement smart radio environments, it provides other advantages over current RIS configurations, including the integrated intensity-only sensing feature eliminating the necessity of computationally complex joint channel estimation, the simultaneous sensing and reflection features allowing for seamless and full-autonomous operation of the RIS without the requirement of switching between reflection and absorption modes, and sensing from all the elements doesn't require dedicated receiver elements and retains information from the full spatial capacity of the RIS in the sparsely sensed data.

In some embodiments, the disclosed systems and methods capture intensity only data that can be analyzed to detect angle of arrival (AoA) of incident electromagnetic signals. AoA detection is an important functionality for transmitters, receivers, reflectors, relays, repeaters, and the like in wireless communication networks, radars, and navigation systems, for example. Using only the intensity of the signal significantly simplifies the required circuitry. This configuration, method of use, and the associated processing are described below. In some embodiments, the disclosed systems and methods can operate over a narrowband and require only a single receiver while maintaining high angular/spatial resolution.

Sparse Sensing of Phaseless Data

Figure 1B:
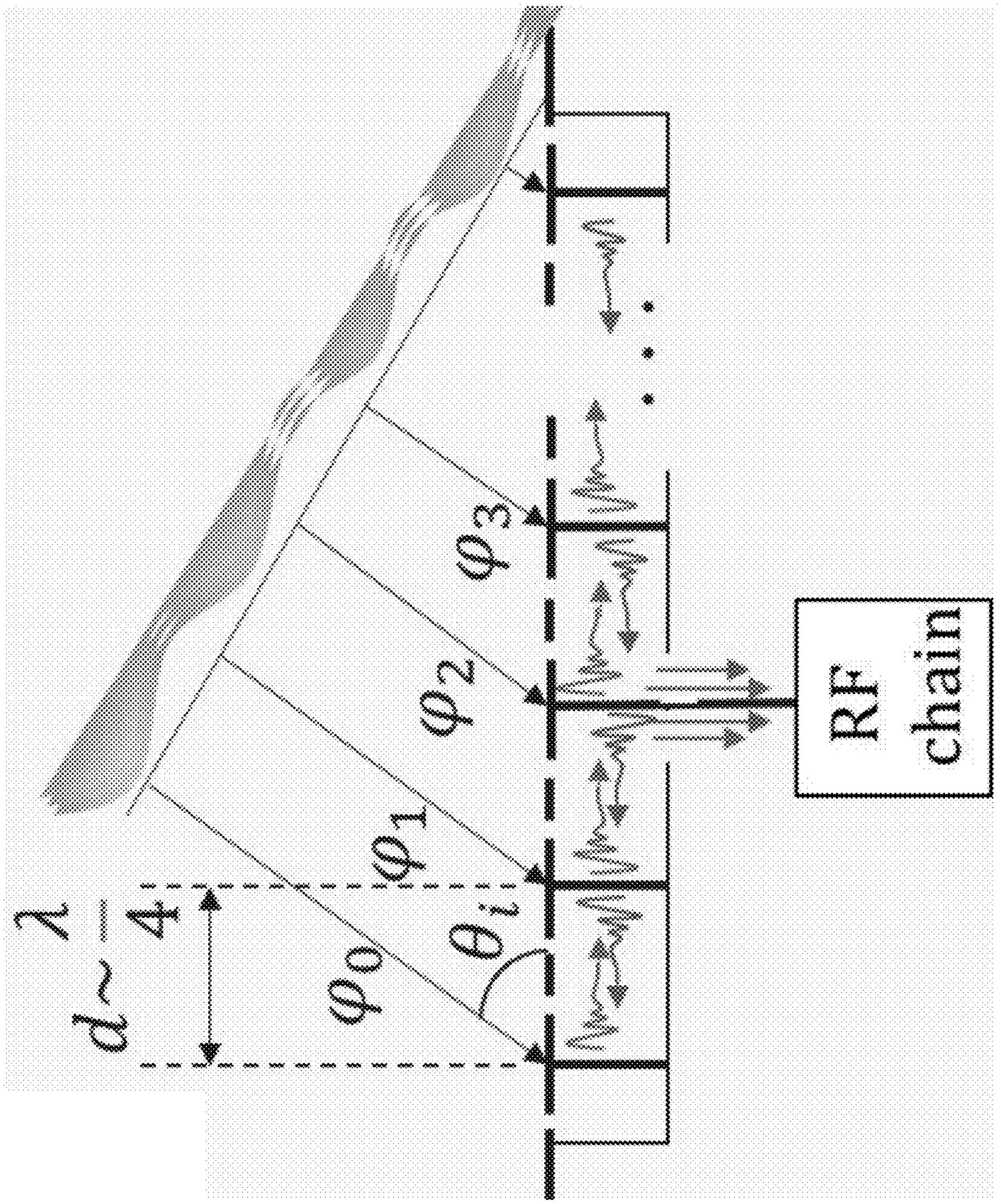

Recovering complex incident signals can overcomplicate a RIS configuration, outdoing the benefits it can bring to the network. This is especially true for the case where one connects circuitry for phase (and intensity) detection to each element of a RIS which typically can have hundreds of elements. Such a setup is shown schematically in FIG. 1A. To circumvent this issue, previous works have suggested using compressive sensing of the incident wave from signal collected by one to a few receiving circuits. Using a sparse array of receivers can reduce the spatial resolution of the detecting aperture. One solution to this problem, as suggested in Alamzadeh et al. 2022, is to use multiplexing of the incident signal on all elements in the shared substrate of the elements as shown in FIG. 1B. This can be possible when elements of the RIS exhibit random scattering responses. The multiplexed signal can then be computationally processed to retrieve the incident signal on all elements. The only requirement is to obtain diverse measurements of the incident signal which can be accomplished by using different multiplexing weights. In the case of Alamzadeh et al. 2022, the varactors exciting each element are set randomly. In this manner, the signal coupled to the substrate from each element is randomly weighted, resulting in diverse measurements of the incident signal.

Figure 2:
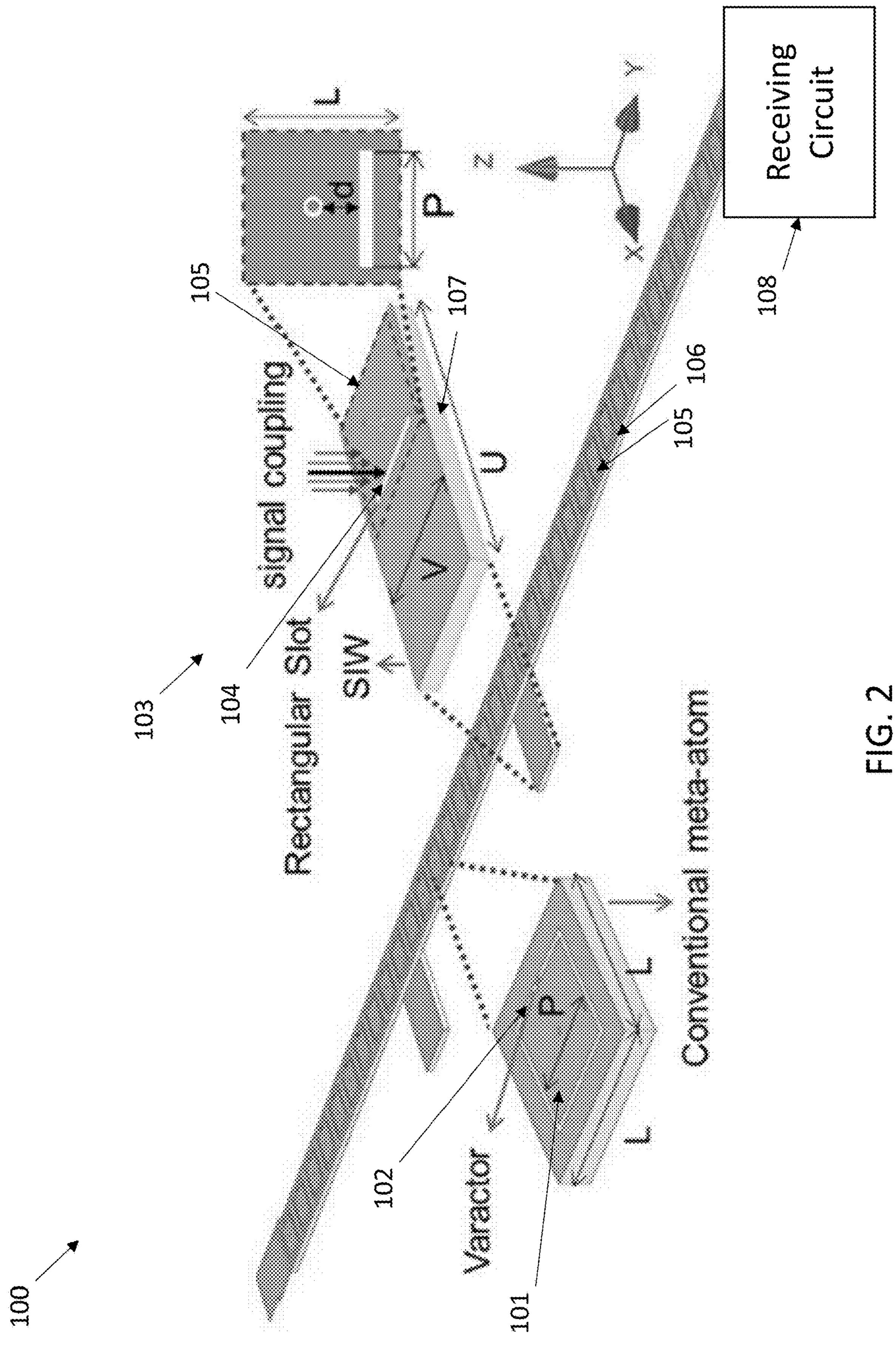
FIG. 2 depicts an exemplary RIS architecture for intensity only measurement in accordance with some embodiments.
Figure 3A:
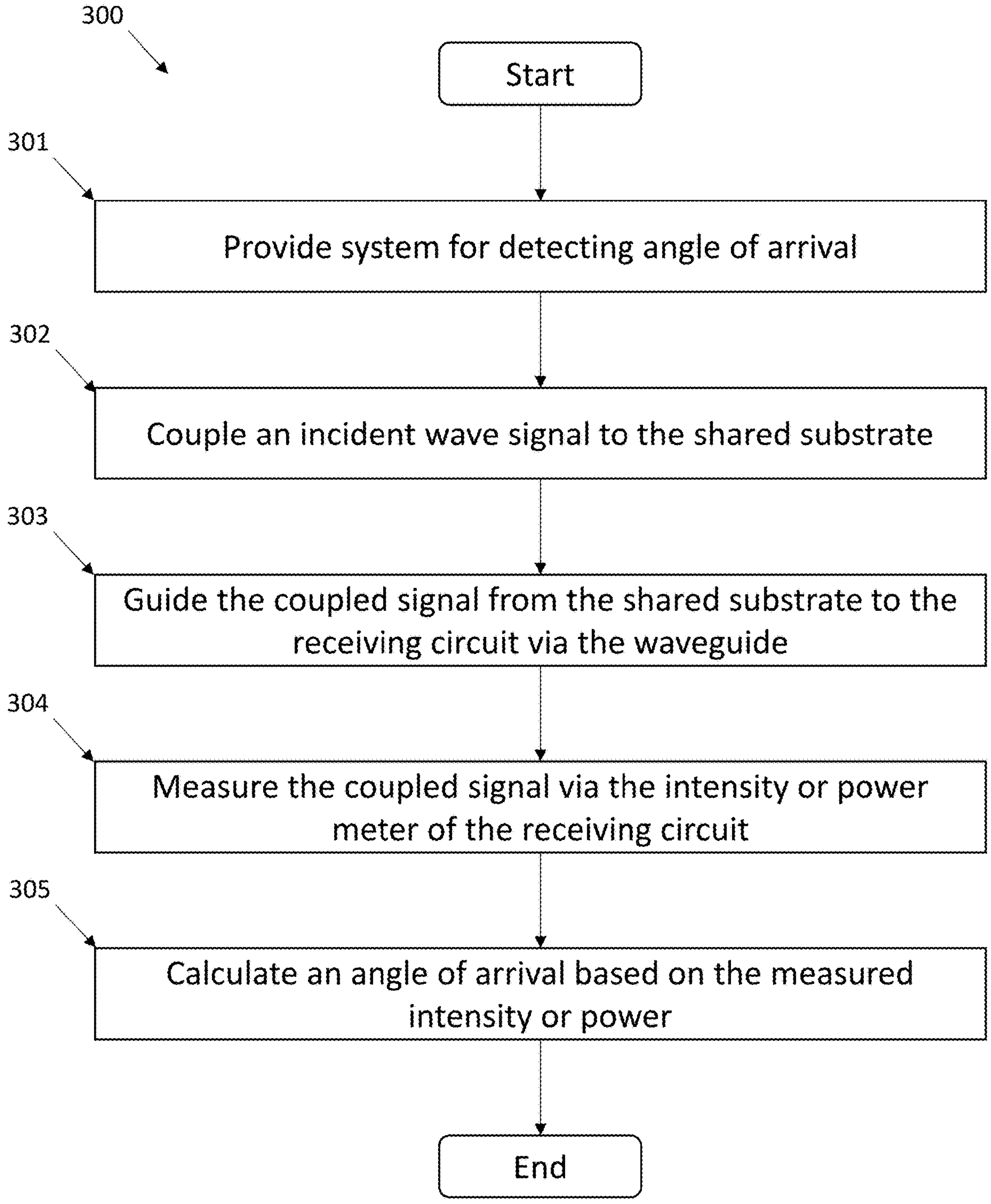
FIGS. 3A-3B are flow charts depicting methods for AOA detection via intensity-only measurement in accordance with some embodiments.
Figure 3B:
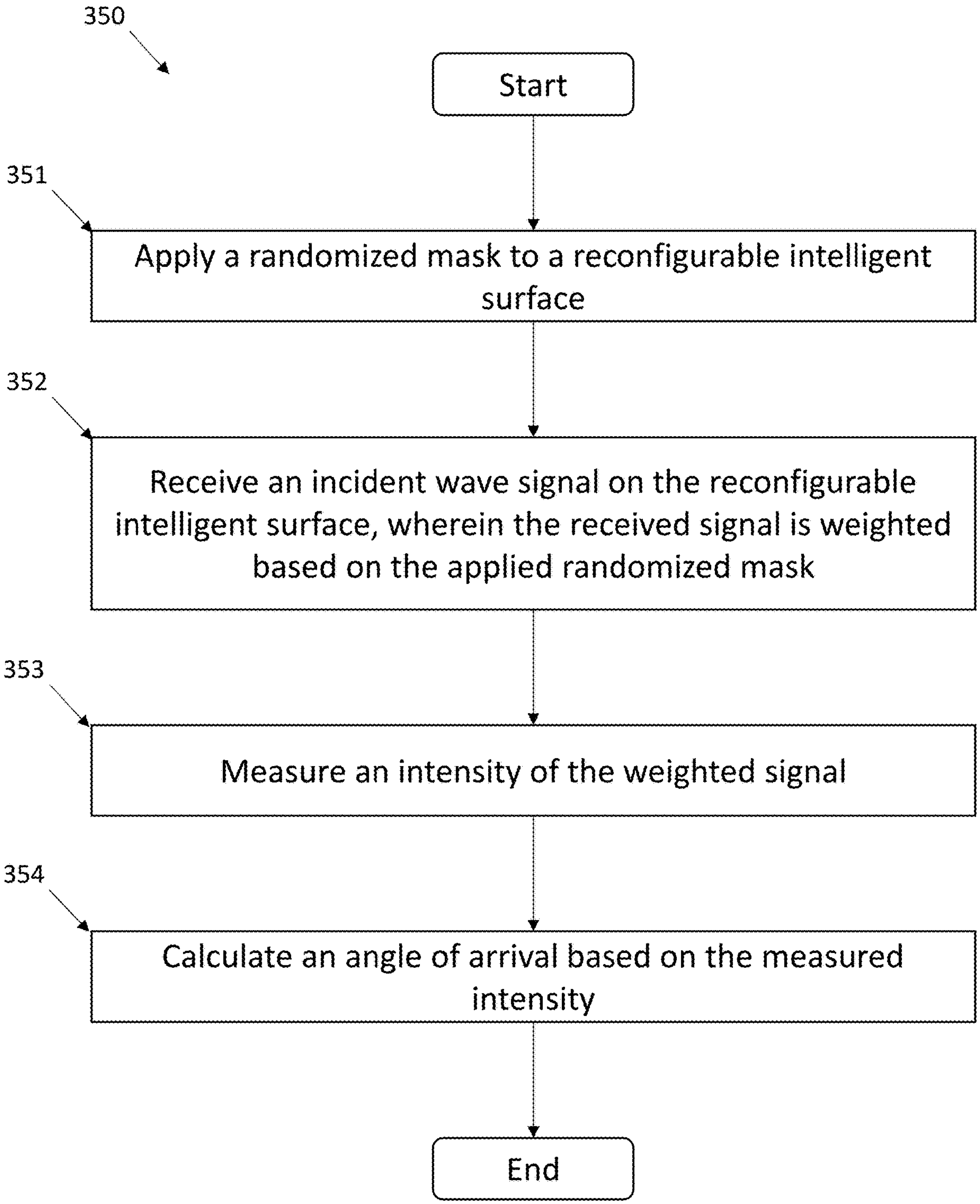

To realize this sensing protocol, one possible implementation is to use a RIS with two different meta-atoms as shown in FIG. 2. The geometrical properties of this structure are detailed in Alamzadeh et al. 2022 (I. Alamzadeh, et al., *IEEE Access,* 2022) which is incorporated herein by reference in its entirety. In one example P is 1 to 20 mm, U is 20 to 50 mm, V is 10 to 30 mm, d is 1 to 10 mm and L is 5 to 25 mm. In one example P=8.1 mm, U=35 mm, V=17.5 mm, d=3.7 mm and L=13.1 mm. The RIS system 100 is comprised of mushroom structures 101 each loaded with a varactor diode 102. (D. Sievenpiper, et al., *IEEE Transactions on Microwave Theory and techniques,* 1999) To implement hybrid meta-atoms 103, as shown in FIG. 2, a rectangular slot 104 is added to the ground plane 105 of the common substrate 106 of the RIS to couple waves into a collecting waveguide 107. The dimensions, sizes, and compositions of both the hybrid meta-atom 103 and the RIS array 100 are similar to the one in Alamzadeh et al. 2022 (e.g. the operating frequency is considered to be 5.8 GHz). As shown in Alamzadeh et al. 2022, such geometry can sense incident signals as well as redirect them toward desired directions. However, in contrast to Alamzadeh et al. 2022, only two hybrid elements are used in this work. The goal was to use this setup to retrieve relevant information about the channel (i.e. AoA) using only the intensity of the received signal.

In some embodiments, the system 100 comprises an array of metamaterial or resonant elements that share the same dielectric substrate 106 and metallic ground layer 105. Each of the elements is loaded with a switchable component that can be addressed independently and change its effective response. The wave incident on these elements couples to the shared substrate 106. A mechanism to couple the wave inside the shared substrate to another layer is introduced by introducing openings 104 inside the ground layer 105. In the layer below the ground plane, waveguides 107 are used such as substrate integrated waveguides to guide the coupled signal to one or more receiving circuitries 108. In some embodiments, the system 100 further includes control circuitry to bring DC signals to each element, and circuitry for intensity measurement and/or signal subtraction. Any suitable circuitry can be utilized In some embodiments, the system further includes a computing system, such as computer 800, communicatively connected to the array 100, the switchable components 102, and/or the receiving circuit 108. In some embodiments, the computing system comprises a processor and a non-transitory computer-readable medium with instructions stored thereon, which when executed by the processor, perform steps comprising receiving a measured intensity or power of the coupled signal from the intensity or power meter of the receiving circuit 108, and calculating an angle of arrival based on the measured intensity or power.

In some embodiments, for one exemplary mode of operation, the elements are addressed to exhibit a random response. As a result, the wave incident on system 100 scatters randomly inside the shared substrate 106. The field coupled to the sampling waveguides 107 thus becomes a randomly multiplexed version of the incident signal carrying information about the wave incident on the whole aperture. In some embodiments of system 100, two of these coupling/sampling waveguides suffice. In some embodiments, for one exemplary mode of operation, the signals collected by these waveguides are subtracted from each other and measured by a single intensity/power meter. The multiplexed signal can then be computationally processed to retrieve information about the incident signal on all elements. The only requirement is to obtain diverse measurements of the incident signal which can be accomplished by using different multiplexing weights. To do that, the switchable components, such as the varactors 102, loading each element are set randomly. In some embodiments, the switchable components can comprise varactor diodes, PIN diodes, Schottky diodes, transistors, MEMS switches, phase change materials, liquid crystals, or any other suitable switching components or combinations thereof. Herein, a configuration of switchable components is referred to as “masks” for brevity. By using different random masks, diverse measurements of the incident signal can be made. Since changing the state of switchable components can occur much faster than any change in the incident signal, one can obtain several measurements of the same signal before any substantial change to the environment.

When using intensity only data, the inverse problem at the heart of AoA detection becomes much more complicated. To better illustrate this point, consider the case of two antennas tasked with detecting the AoA of an incident signal. By examining the phase difference (or time difference) between signals incident on the two antennas one can detect AoAs. The intensity of the received signal on the antennas will in fact be almost identical. In other words, intensity-only data do not usually exhibit variation as a function of AoA. If instead, one combines the complex signals of the two antennas with random weights before measuring the intensity, the resulting intensity would depend on the phase of each signal and thus would change as a function of the AoA. When applying a similar idea to the RIS, note that the random multiplexing of the incident signals can happen naturally in the disclosed RIS configuration. Specifically, when the surface of the RIS system 100 exhibits a random surface reactance, the signal incident on it scrambles inside. This scrambling of the signal manifests itself as a multiplexing of signals incident on all elements. The signal at the end of the collecting waveguide can thus be described as a random weighted sum of signals incident on all elements. If one examines the intensity of such a received signal, it changes as a function of the incident signal. One issue with the random weighted sum is that it reduces the dimensionality of the incident signal from all elements to a single measurement. To overcome that, inspired by the compressive microwave imaging, one can use different random masks. Similar to Alamzadeh et al. 2022, binary masks can be used where the varactor 102 loading each element may randomly take one of the two different capacitive states. The resulting multiplexed signal can then be processed computationally to derive the AOA of the incident signal (demultiplexing).

In some embodiments, a method 300 to detect angle of arrival starts at Operation 301 where the system 100 as described herein is provided. At Operation 302 an incident wave signal is coupled to the shared substrate 106. At Operation 303 the coupled signal is guided from the shared substrate 106 to the receiving circuit 108 via the waveguide 107. At Operation 304 the coupled signal is measured via the intensity or power meter of the receiving circuit 108. Method 300 ends at Operation 305 where an angle of arrival is calculated based on the measured intensity or power.

In some embodiments, the incident wave is coupled to the shared substrate 106 via an opening 104 inside the ground layer 105. In some embodiments, method 300 further includes addressing the metamaterial or resonant elements of the array to exhibit a random response. In some embodiments, the coupled signal comprises a randomly multiplexed version of the incident signal. In some embodiments, method 300 further includes applying one or more multiplexing weights. In some embodiments, the one or more multiplexing weights are applied via setting the switchable components 102 randomly. In some embodiments, a multiplexing weight comprises a mask. In some embodiments, the mask comprises a binary mask where each switchable element 102 takes one of two different capacitive states. In some embodiments, a plurality of measurements of the coupled signal are performed before any substantial change to the environment occurs. In some embodiments, the signal within the waveguide comprises a random weighted sum of signals incident on all elements.

In some embodiments, a method 350 to detect angle of arrival via intensity only data starts at Operation 351 where a randomized mask is applied to a reconfigurable intelligent surface. At Operation 352 an incident wave signal is received on the reconfigurable intelligent surface, where the received signal is weighted based on the applied randomized mask. At Operation 353 an intensity of the weighted signal is measured. Method 350 ends at Operation 354 where an angle of arrival is calculated based on the measured intensity. In some embodiments, the randomized mask is applied to the reconfigurable intelligent surface via setting a plurality of switchable components of the reconfigurable intelligent surface. In some embodiments, the randomized mask comprises a binary mask where each switchable element is set to one of two different capacitive states.

The aforementioned systems, processes and methods described herein may be utilized for desired applications as would be appreciated by those skilled in the art. For example, the systems and methods described above can be utilized in any suitable RF/microwave system relying on AoA detection for improved performance. This includes many wireless communication networks (such as current and future WiFi systems, 5 g and 6 g networks, etc.) that use AoA for adaptive beamforming. The disclosed systems and methods can further be used to implement smart autonomous wireless power transfer where the device to be charged can be tracked by the system. The disclosed systems and methods can also be used to implement a tracking radar or navigation system both in an active manner as well as in a passive manner where signals of opportunity (such as those from base stations) are used to deduce coordinates without requiring complicated RF circuitry for complex signal detection.

EXPERIMENTAL EXAMPLES

The invention is now described with reference to the following Examples. These Examples are provided for the purpose of illustration only and the invention should in no way be construed as being limited to these Examples, but rather should be construed to encompass any and all variations which become evident as a result of the teaching provided herein.

Without further description, it is believed that one of ordinary skill in the art can, using the preceding description and the following illustrative examples, make and utilize the present invention and practice the claimed methods. The following working examples therefore specifically point out exemplary embodiments of the present invention and are not to be construed as limiting in any way the remainder of the disclosure.

To demonstrate the points detailed above, the setup shown in FIG. 2 was used in electromagnetic full-wave solver Ansys HFSS. In the studies signals incident on the RIS were considered to be X-polarized plane waves in the YZ plane.

The goal of the sensing process was to deduce the AoA of the incident signal by using only intensity data. As was done in previous works, the signal difference between the two adjacent collecting waveguides was focused on. In practical implementation, the signal difference between the collecting waveguides can be formed using a simple RF device such as a 180° RF combiner. The intensity of the difference between the two signals can be sensed using a voltage or a power detector. Thus, only a single RF transmission line is required to pass the intensity data to a processor. The intensity of the difference of the simulated signal was taken at the end of each collecting waveguide numerically.

Figure 4:
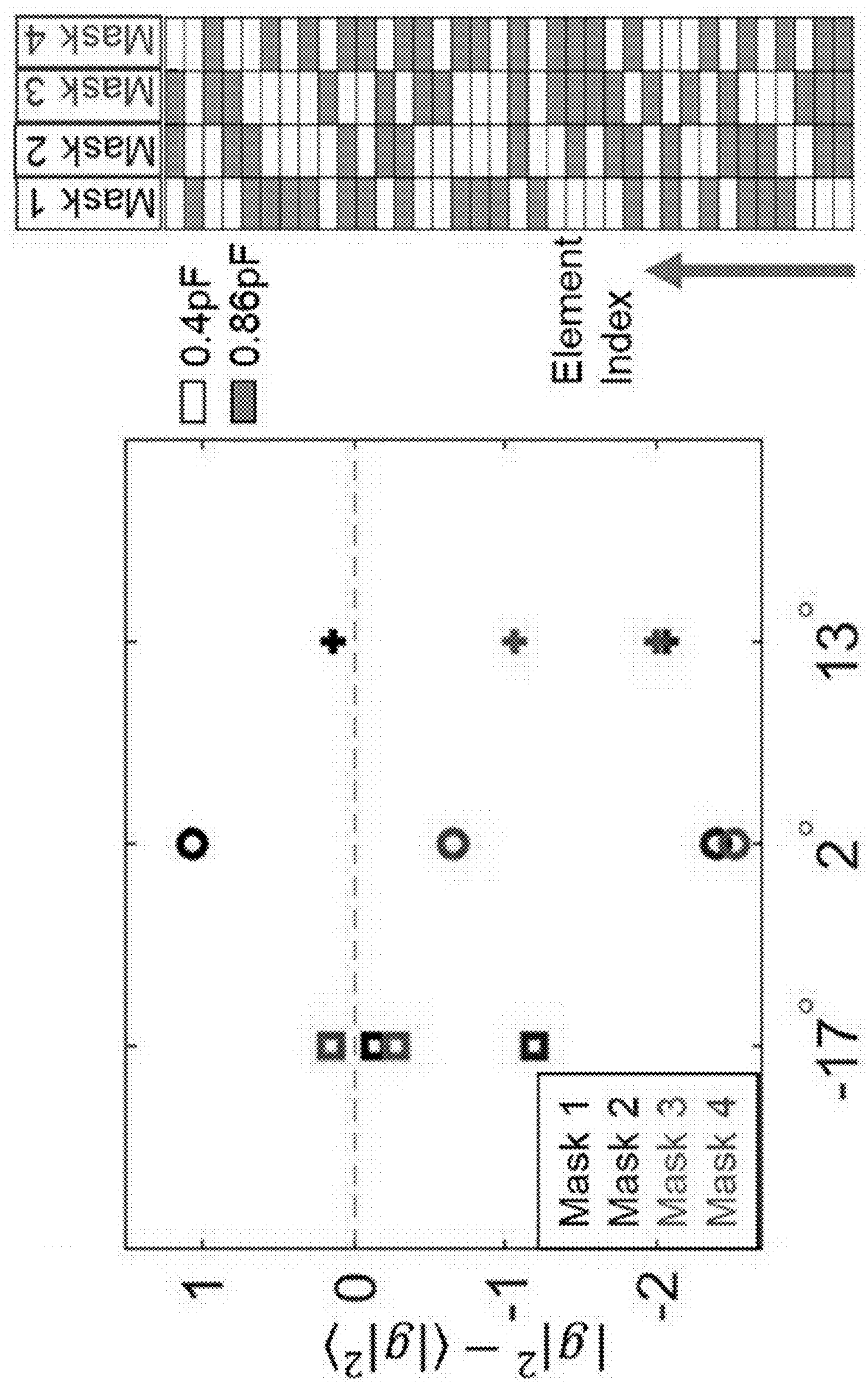
FIG. 4 is a plot depicting experimental simulation results for intensity data for different AoAs in accordance with some embodiments. Data captured from the same mask are identified with the same color.

Denote the intensity of the difference signal obtained in the above manner with $|g|^2$. This signal is plotted in FIG. 4 for different AoAs. One can clearly see that the intensity of the signal changes as a function of the AoA, confirming that the intensity signals contain AoA-specific features. Also plotted is the signal intensity for different masks for each AoAs in FIG. 4. One can clearly see that for the same AoA (denoted by the color), the phaseless data changes as a function of masks, thereby validating the proposition to use random masks to diversify the data.

Computational Ghost Imaging

While the previous section illustrates the fact that intensity only data are related to the AoA of the incident signal, an algorithm still needed to be formulated to retrieve that information. In recent years, there has been a strong push to extend microwave imaging and sensing to phaseless detection. Various algorithms and hardware systems have been disclosed for this purpose. In this work, inspired by the analogy of signal multiplexing in the disclosed RIS and that in DMAs in Diebold et al. 2018, it was selected to use computational ghost imaging. Yet, unlike the active imaging approach in Diebold which relied on spatially diverse transmitted signals to retrieve reflectivity maps, the disclosed protocol does not transmit signals, instead, it relies on the intensity of the incident signal.

The algorithm was formulated to retrieve AoA from the intensity-only data based on computational ghost imaging. Previously, ghost imaging has been used in active microwave imaging applications based on dynamic metasurface antennas. Here, the innovative approach of applying the ghost imaging technique for wireless sensing of incident signals was used which is functionally different from active microwave imaging. To illustrate the ghost imaging process to demultiplex the sensed intensity signal to deduce AoAs, note that in the prescribed framework, the signal difference between the two collecting waveguides was used. This difference can be implemented using well-known RF combiners. The intensity of this difference signal can be sensed using a voltage or a power detector. In other words, only a single RF transmission line and a simple receiving circuitry are required. Regardless of the implementation of the signal subtraction or circuitry, a real-valued signal measurement was used for each mask.

To capture sufficient information for successful AoA estimation, the incident signal was sensed multiple times using S random masks. Each sensed signal comprised of the fields coupled to the hybrid meta-atoms and observed at the end of the SIWs attached to two hybrid meta-atoms. Denote these two fields readings at the end of the SIWs as $g_1$ and $g_2$. For the studies, the absolute difference between the two data streams was examined. The final captured intensity $|g|^2$ is then a real-valued vector, denoted as:

$$|g|^2 = |g_1 - g_2|^2 \in \mathbb{R}^S \tag{1}$$

Following the computational ghost imaging formulation, the mean of $|g|^2$ was subtracted from $|g|^2$. The result is denoted by:

$$I_g = |g|^2 - \langle |g|^2 \rangle \tag{2}$$

In this framework, AoA is determined based on the correlation of the collected intensity with a set of reference data. The reference data are comprised of a collection of known $I_g$ for a set of pre-selected AoAs. Specifically, 25 AoAs uniformly distributed between +60° were used to construct the reference sensing matrix H. In this manner, the continuous AoA range was discretized into 5° bins. This bin size is related to the overall size of the RIS and its angular resolution (Alamzadeh et al. 2022). The simulated data for each of the reference AoAs are collected in each of the columns of H. The estimated values are then determined from the cross-correlation between $I_g$ and H.

$$R_{IH} = \frac{1}{S} I_g^* H \tag{3}$$

The estimated parameter can then be related to the AoA in a similar manner as in Alamzadeh et al. 2018, where the maximum of $R_{IH}$ occurs at the bin-center closest to the actual incident AoA. The correlation in Eq. (3) acts as a pattern matching parameter between the data of the incoming AoAs and the reference AoAs. Thus, the estimated AoA is the angle in H that has the highest correlation with $I_g$. In other words, true AoA can be estimated from the maximum value given by Eq. (3).

Estimation and Results

Figure 5:
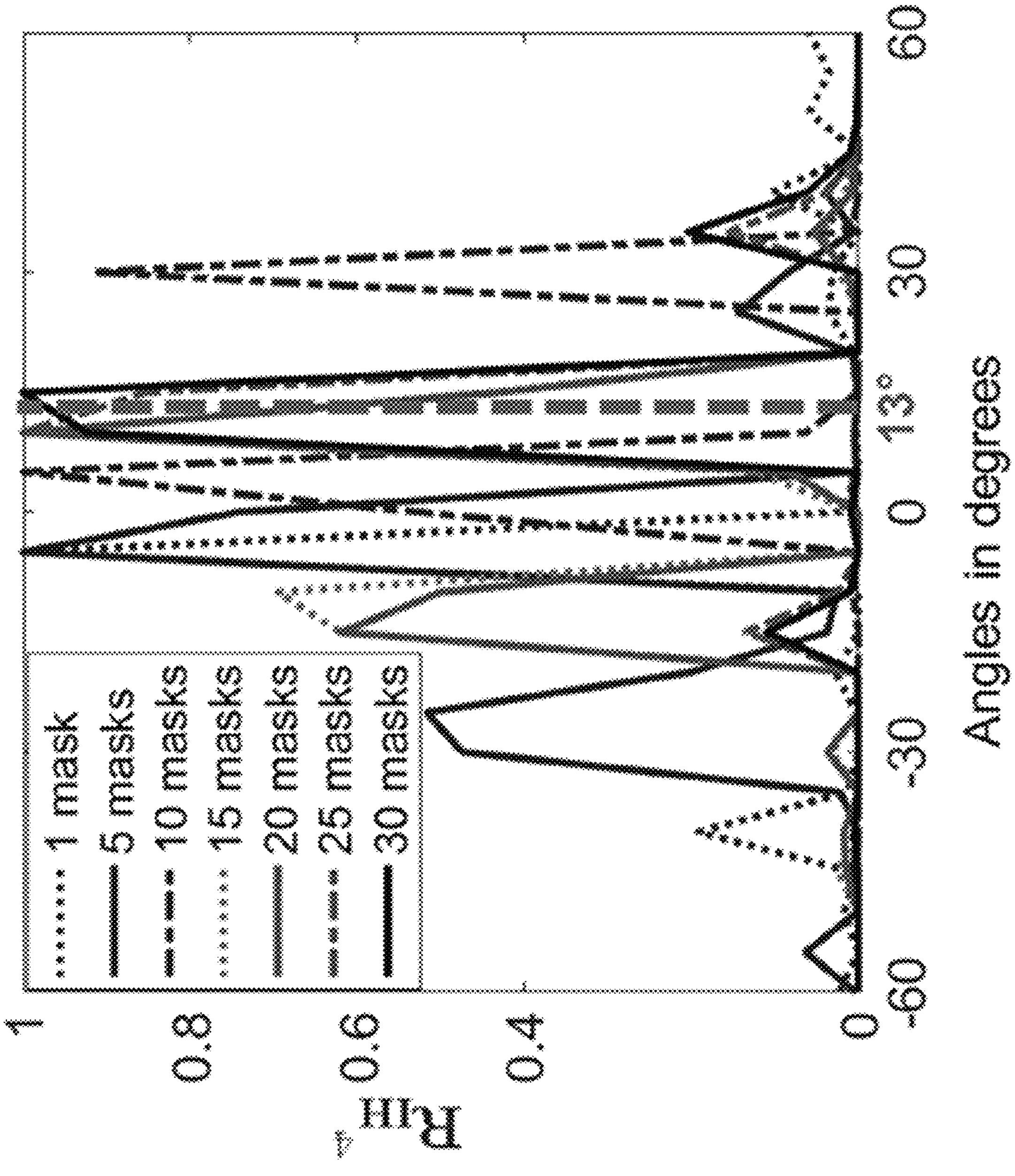
FIG. 5 is a plot depicting experimental simulation results for peak detection at 10 dB SNR for a single AoA with a range of masks. The dotted line represents the actual AoA, i.e., 13°.

It is important to note that the number of masks may have a significant impact on the accurate estimation of the actual AoA. Thus the analysis was begun by examining this factor. Toward this goal, an illustrative example of the AoA detection process for a signal incident at 13 degrees at 10 dB signal-to-noise ratio (SNR) is plotted in FIG. 5 as the number of masks was increased. One can clearly see that using 1 mask or one measurement is not sufficient to detect the AoA. As one increases the number of masks, more diverse information is obtained, and a better estimate is achieved. However, the increase in the amount of information newer masks provide starts to plateau. One can see from FIG. 5 that using around S=30 masks should suffice for the purpose of finding AoA. This test was conducted for other AoAs (not shown here for brevity) and arrived at a similar conclusion.

Having set the required number of masks, the performance changes for different AoAs was examined, as shown in FIGS. 6A-6D. As expected, the maximum correlation occurs at the bin-center closest to the test angle. To mimic realistic sensing operations, operations under the assumption that the wireless environment is noisy were considered. A resemblance between the simulation environment and a practical noisy environment was maintained by adding white Gaussian noise to the incoming test signals $g_1$ and $g_2$. In fact, the examples of AoA detections presented in FIGS. 6A-6D are done with a signal-to-noise (SNR) of 20 dB.

Figure 6A:
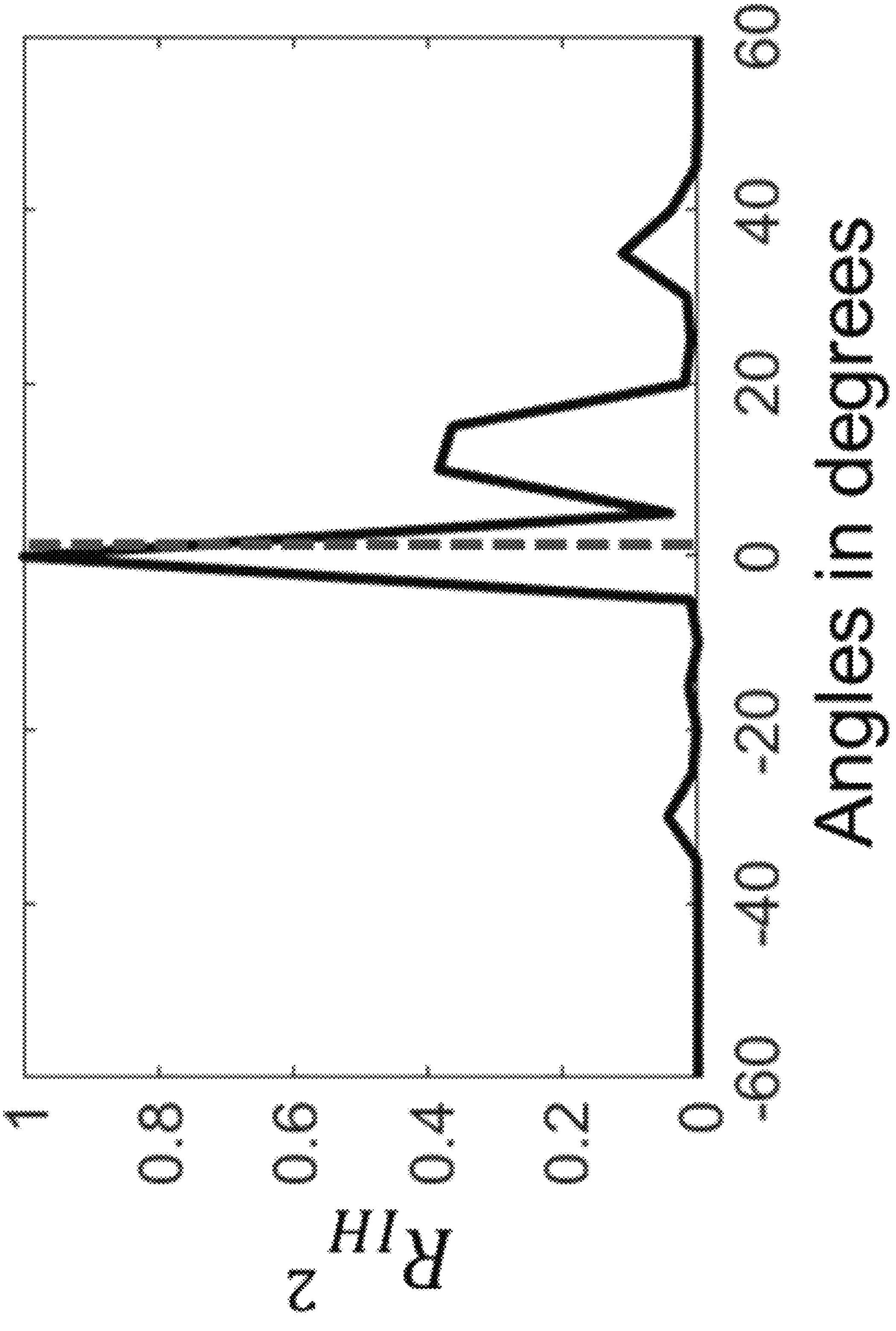
FIGS. 6A-6D are plots depicting experimental simulation results for peak detection with 30 random masks for 2° (FIG. 6A), 13° (FIG. 6B), −5° (FIG. 6C), and −17° (FIG. 6D) AoA in accordance with some embodiments. The dotted red lines denote actual AoAs.
Figure 6B:
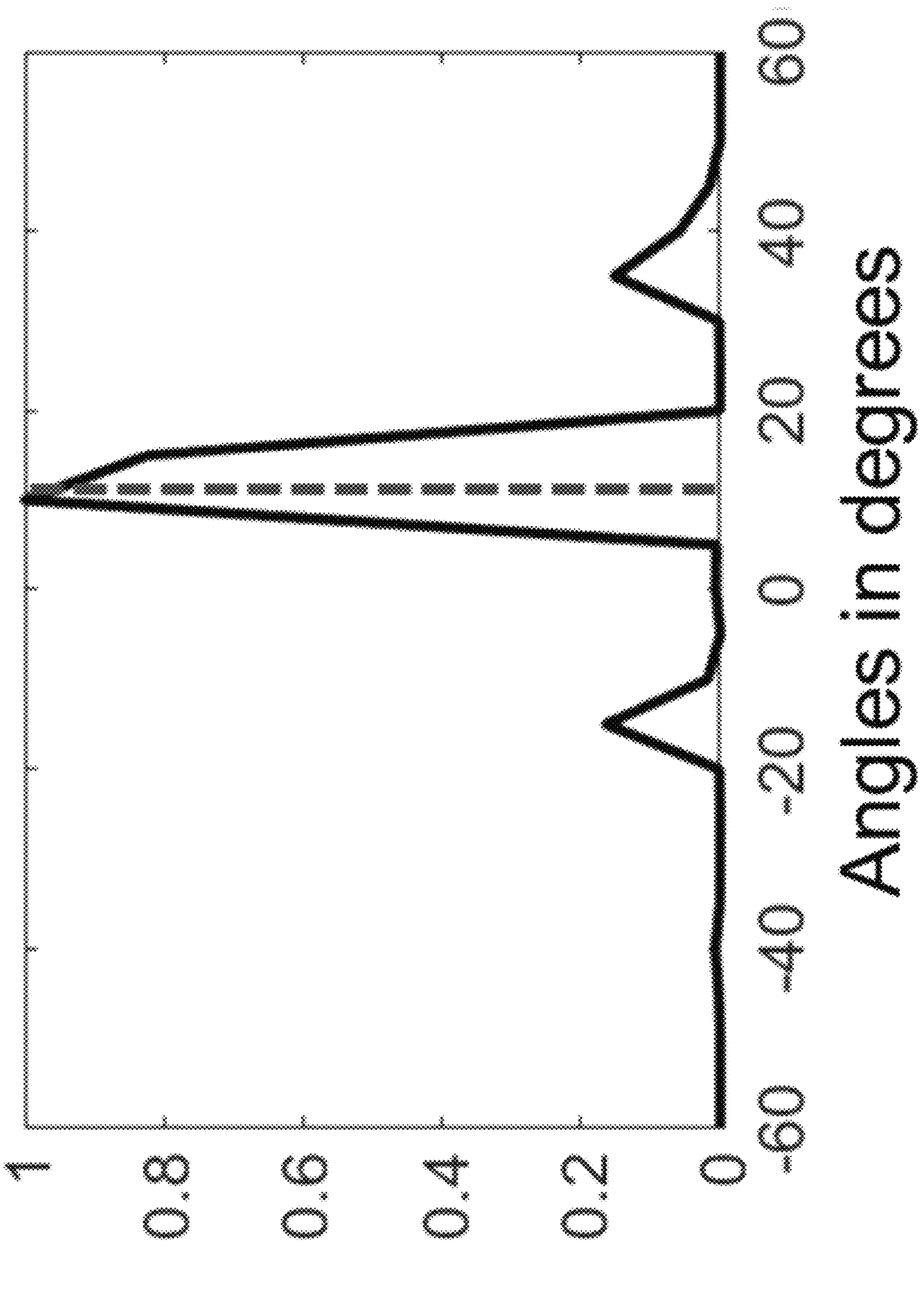
Figure 6C:
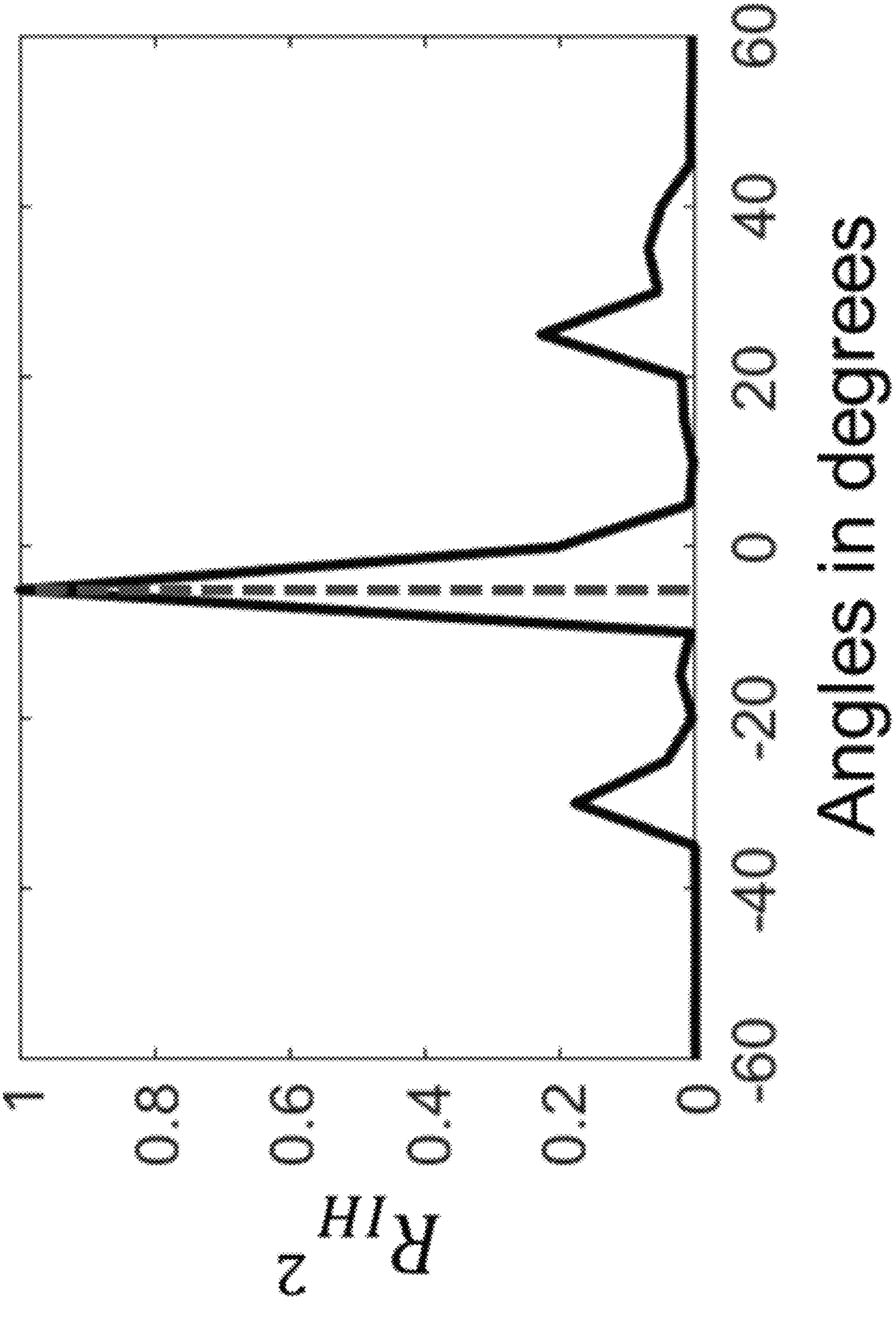
Figure 6D:
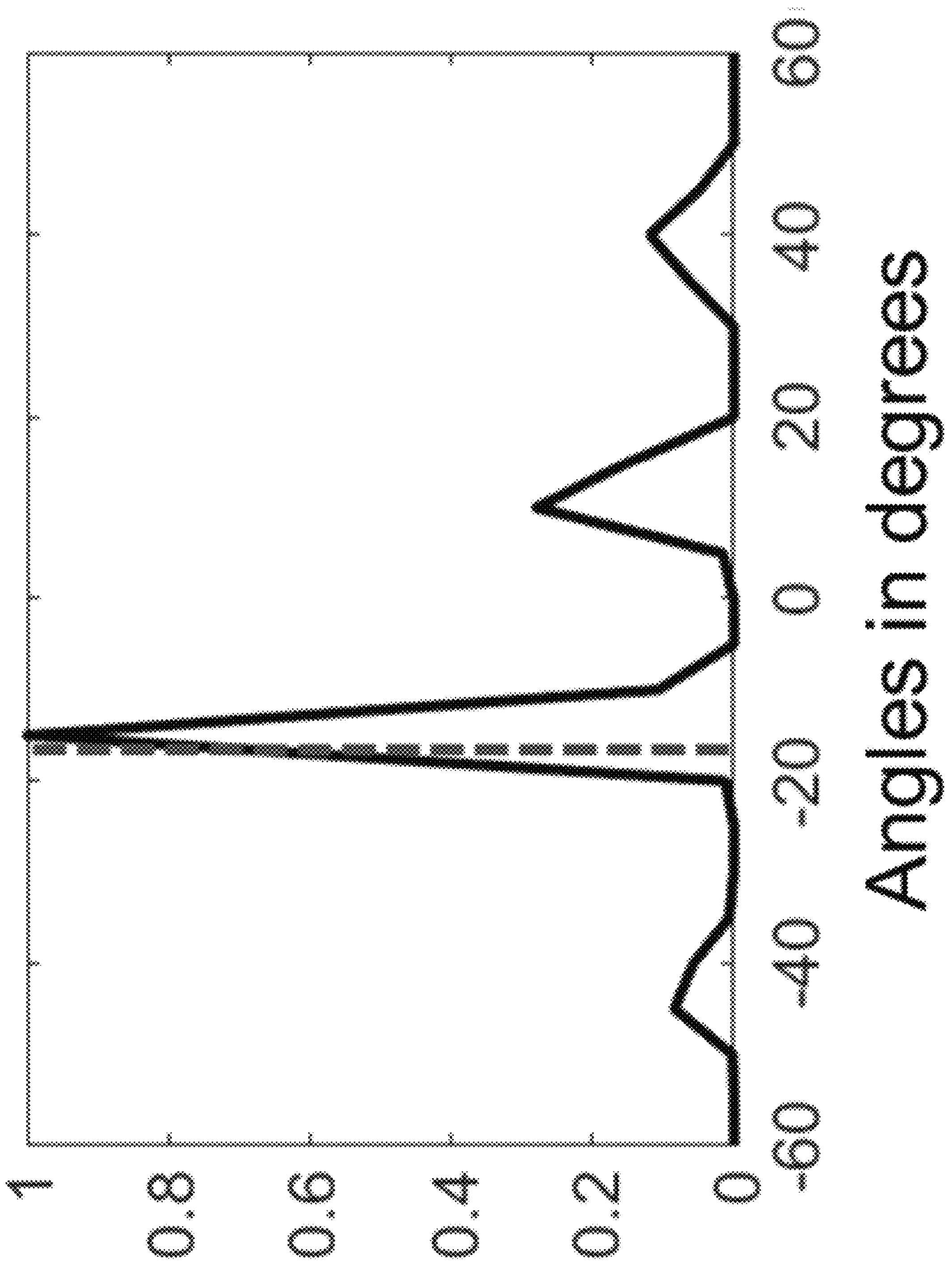
Figure 6E:
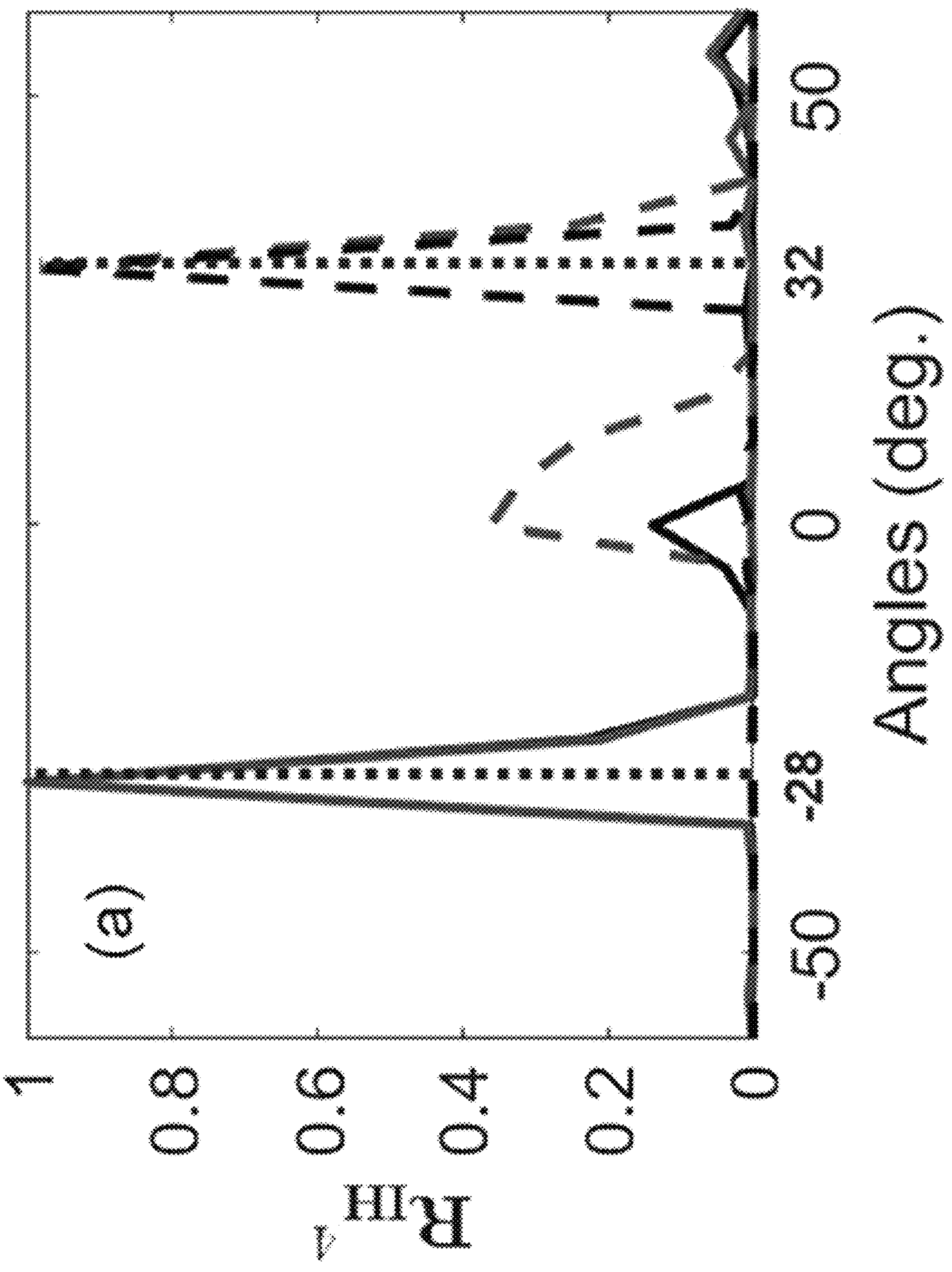
FIGS. 6E-6F are plots depicting experimental simulation results for detection of two different incident AoAs (FIG. 6E) (superimposed with solid and dashed lines) using GI (black) and CGS (red), and estimated AoAs for different incident AoAs (FIG. 6F) in accordance with some embodiments.
Figure 6F:
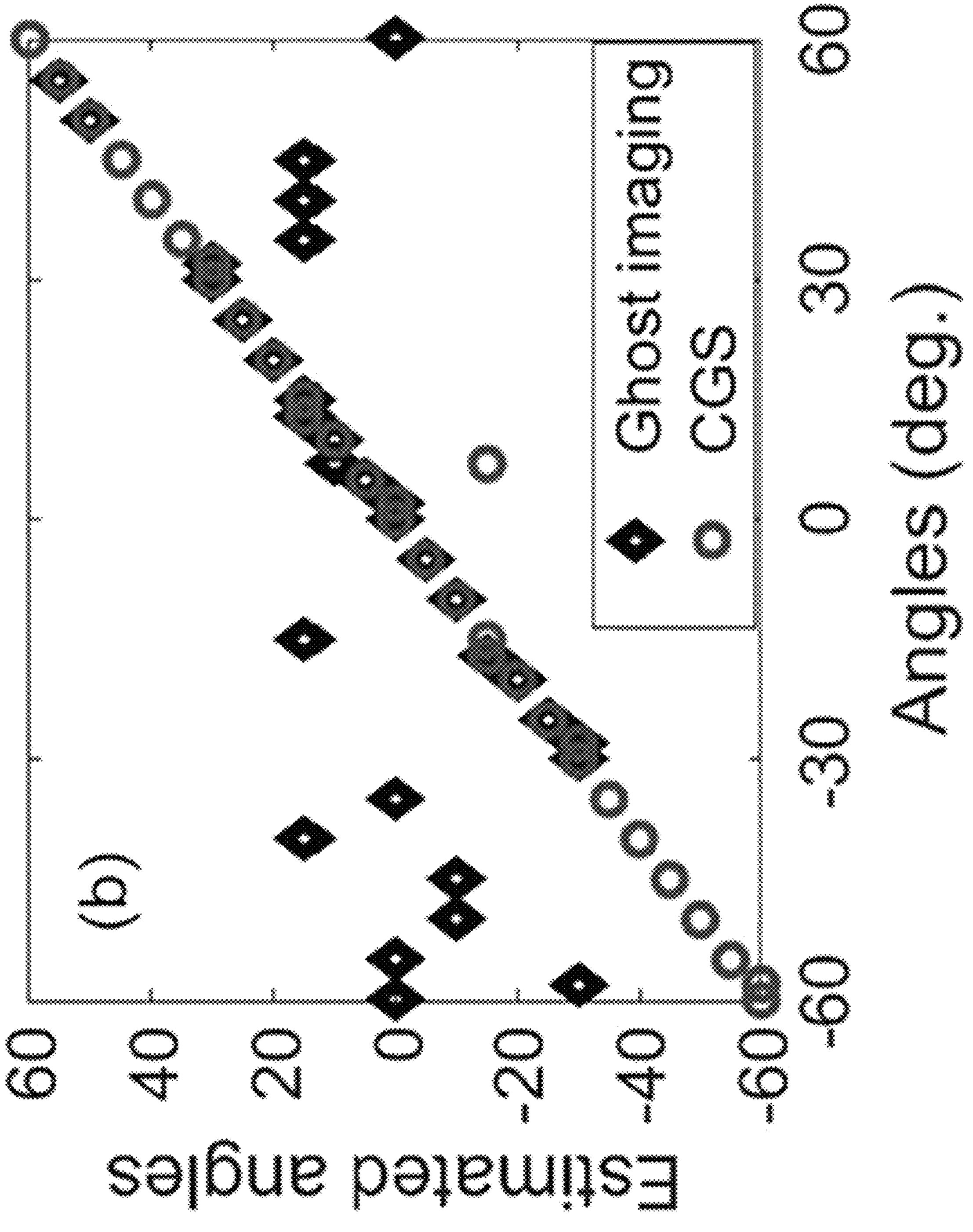
Figure 7:
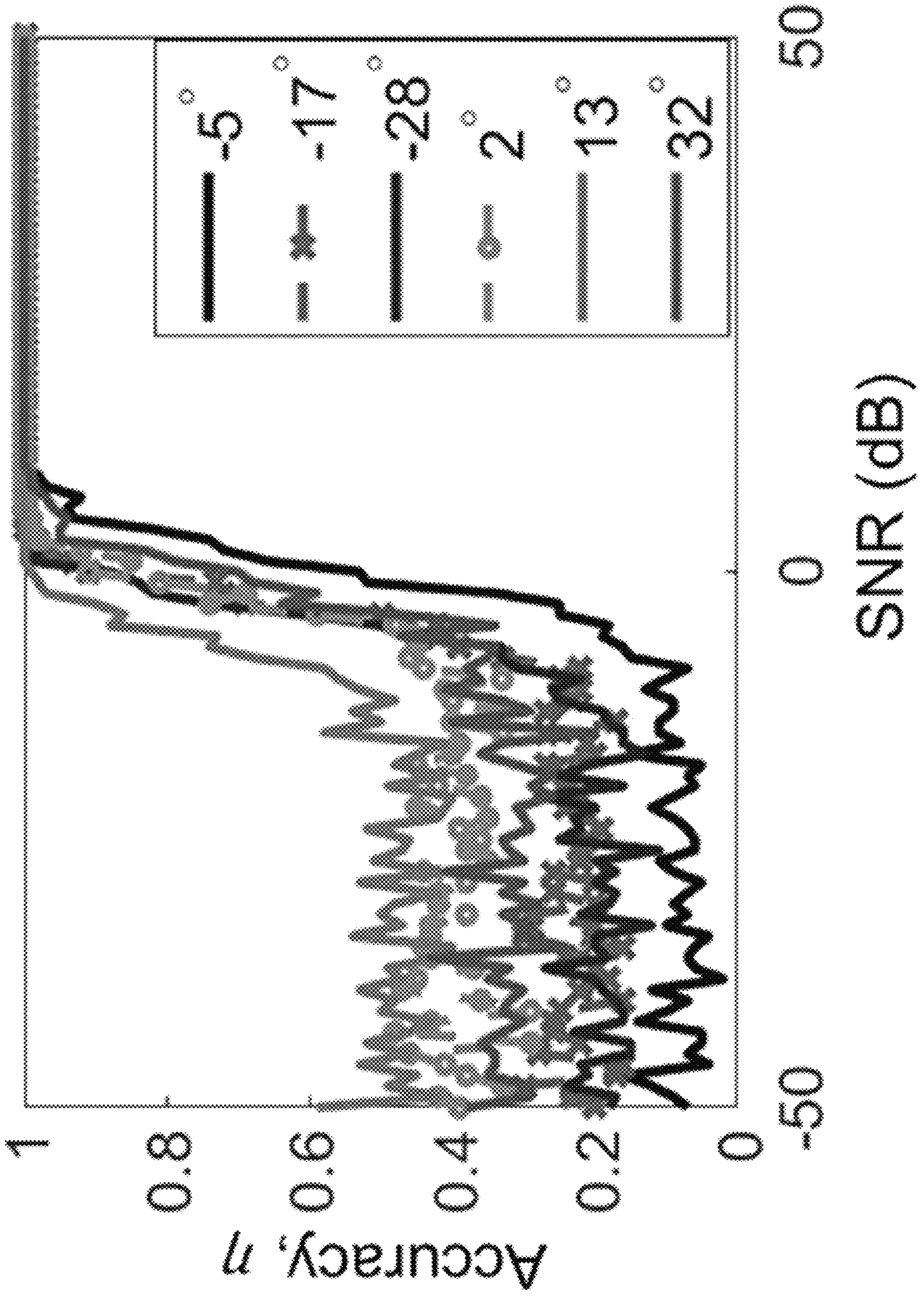
FIG. 7 is a plot depicting experimental estimation accuracy of detecting a set of AoAs in accordance with some embodiments.

FIG. 6E shows additional experimental simulation results on the performance changing for different AoAs. In FIG. 6F the estimated AoA is depicted for incident angles for the whole range of ±60°. As shown, the estimated angles are close to the incident AoAs. However, the estimation fidelity degrades for angles that are farther from the normal, which, to some extent, is expected as the resolution degrades and larger bin sizes should have been used. In some embodiments, by applying a second detection algorithm such as an iterative solver to the GI problem (e.g., conjugate gradient squared (CGS)), one can obtain accurate estimates for the whole ±60° range.

Next, the accuracy of estimation of a test angle was calculated. To do that, note that the accuracy in detecting an AoA depends on the bin size used to discretize the range of incident angles (i.e. 5 degrees). With that in mind, a slightly larger bin-size was used for setting the accuracy of detection since when the test AoA is halfway between two reference AoAs, either of the reference AoAs may be considered to be the estimated AoA with minimal degradation to the overall performance. Therefore, an estimation within ±3° of the true AoA was considered as accurate. Otherwise, the estimation was considered inaccurate. Thus, the estimation was a binary classification problem that assigns a value of 1 to an accurate estimation and 0 otherwise. This accuracy was calculated for SNR values between −50 dB to 50 dB. Because of the random nature of the noise, the accuracy calculation for each SNR value was averaged over 100 repetitions to eliminate random fluctuations in the accuracy.

A few illustrations of the accuracy calculations for a diverse set of AoAs are shown in FIG. 6. Evidently, the disclosed ghost imaging technique can perform accurate AoA estimation with only a single circuitry to acquire the intensity data. Note that the disclosed hybrid RIS can also realize desired beamforming capabilities required for their use in smart radio environments. The beamforming results have been reported for various hybrid geometries before (Alamzadeh et al. 2021, and Alamzadeh et al. 2022) and is not reported here.

In summary, the problem of using intensity only sparse data to retrieve relevant information about the propagation channel was investigated. It was shown that using a RIS with hybrid meta-atoms and multiplexing capabilities along with computational ghost imaging techniques provide a simple solution to this problem. Detecting signal strength or intensity requires a much simpler circuitry compared to other methods which require retrieving phase information, paving the way for the widespread use of RISs with sensing capabilities in wireless systems. An immediate future step is to extend this work to 2D and demonstrate it in further experiments. It is worth noting that binary reactive states were used to construct random masks in this paper. Thus, a potential way to further diversify the sensed data without increasing the number of masks would be to use more than two reactive states in a mask. While intensity data was used in a computational ghost imaging framework, one can instead utilize phase retrieval methods to obtain complete information about the channel. (O. Yurduseven, et al., *IEEE Antennas and Wireless Propagation Letters,* 2017) (E. J. Candes, et al., *IEEE Transactions on Information Theory,* 2015) (B. Fuchs, et al., *IEEE Transactions on Antennas and Propagation,* 2014) It is worth noting that the disclosed scheme is not frequency dependent and can easily be extended to higher frequencies by simple geometrical modifications to the RIS elements. The disclosed configuration can also be used in applications other than wireless communication, for example in reflect arrays to self-correct the direction of the feed (which may change due to mechanical movements) or in wireless power transfer systems to detect the location of the intended target. It can also be used in imaging of the region in front of the RIS or detect human presence in front of the RIS without requiring a complicated system.

Computing Environment

In some aspects of the present invention, software executing the instructions provided herein may be stored on a non-transitory computer-readable medium, wherein the software performs some or all of the steps of the present invention when executed on a processor.

Aspects of the invention relate to algorithms executed in computer software. Though certain embodiments may be described as written in particular programming languages, or executed on particular operating systems or computing platforms, it is understood that the system and method of the present invention is not limited to any particular computing language, platform, or combination thereof. Software executing the algorithms described herein may be written in any programming language known in the art, compiled or interpreted, including but not limited to C, C++, C #, Objective-C, Java, JavaScript, MATLAB, Python, PHP, Perl, Ruby, or Visual Basic. It is further understood that elements of the present invention may be executed on any acceptable computing platform, including but not limited to a server, a cloud instance, a workstation, a thin client, a mobile device, an embedded microcontroller, a television, or any other suitable computing device known in the art.

Parts of this invention are described as software running on a computing device. Though software described herein may be disclosed as operating on one particular computing device (e.g. a dedicated server or a workstation), it is understood in the art that software is intrinsically portable and that most software running on a dedicated server may also be run, for the purposes of the present invention, on any of a wide range of devices including desktop or mobile devices, laptops, tablets, smartphones, watches, wearable electronics or other wireless digital/cellular phones, televisions, cloud instances, embedded microcontrollers, thin client devices, or any other suitable computing device known in the art.

Similarly, parts of this invention are described as communicating over a variety of wireless or wired computer networks. For the purposes of this invention, the words "network", "networked", and "networking" are understood to encompass wired Ethernet, fiber optic connections, wireless connections including any of the various 802.11 standards, cellular WAN infrastructures such as 3G, 4G/LTE, or 5G networks, Bluetooth®, Bluetooth® Low Energy (BLE) or Zigbee® communication links, or any other method by which one electronic device is capable of communicating with another. In some embodiments, elements of the networked portion of the invention may be implemented over a Virtual Private Network (VPN).

Figure 8:
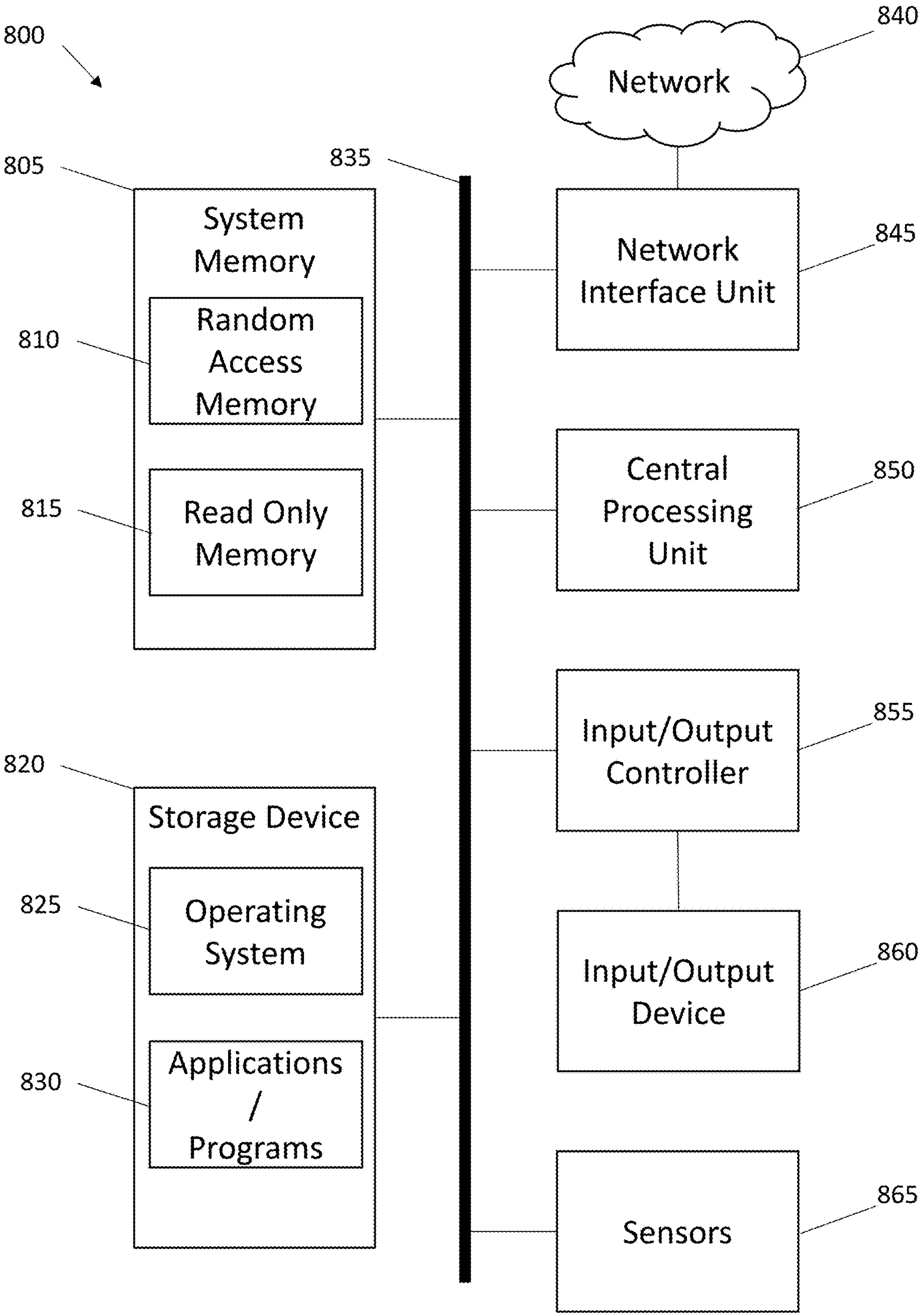
FIG. 8 depicts an exemplary computing environment in which aspects of the invention may be practiced in accordance with some embodiments.

FIG. 8 and the following discussion are intended to provide a brief, general description of a suitable computing environment in which the invention may be implemented. While the invention is described above in the general context of program modules that execute in conjunction with an application program that runs on an operating system on a computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 8 depicts an illustrative computer architecture for a computer 800 for practicing the various embodiments of the invention. The computer architecture shown in FIG. 8 illustrates a conventional personal computer, including a central processing unit 850 ("CPU"), a system memory 805, including a random-access memory 810 ("RAM") and a read-only memory ("ROM") 815, and a system bus 835 that couples the system memory 805 to the CPU 850. A basic input/output system containing the basic routines that help to transfer information between elements within the computer, such as during startup, is stored in the ROM 815. The computer 800 further includes a storage device 820 for storing an operating system 825, application/program 830, and data.

The storage device 820 is connected to the CPU 850 through a storage controller (not shown) connected to the bus 835. The storage device 820 and its associated computer-readable media, provide non-volatile storage for the computer 800. Although the description of computer-readable media contained herein refers to a storage device, such as a hard disk or CD-ROM drive, it should be appreciated by those skilled in the art that computer-readable media can be any available media that can be accessed by the computer 800.

By way of example, and not to be limiting, computer-readable media may comprise computer storage media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the computer 800 may operate in a networked environment using logical connections to remote computers through a network 840, such as TCP/IP network such as the Internet or an intranet. The computer 800 may connect to the network 840 through a network interface unit 845 connected to the bus 835. It should be appreciated that the network interface unit 845 may also be utilized to connect to other types of networks and remote computer systems.

The computer 800 may also include an input/output controller 855 for receiving and processing input from a number of input/output devices 860, including a keyboard, a mouse, a touchscreen, a camera, a microphone, a controller, a joystick, or other type of input device. Similarly, the input/output controller 855 may provide output to a display screen, a printer, a speaker, or other type of output device. The computer 800 can connect to the input/output device 860 via a wired connection including, but not limited to, fiber optic, ethernet, or copper wire or wireless means including, but not limited to, Bluetooth, Near-Field Communication (NFC), infrared, or other suitable wired or wireless connections.

As mentioned briefly above, a number of program modules and data files may be stored in the storage device 820 and RAM 810 of the computer 800, including an operating system 825 suitable for controlling the operation of a networked computer. The storage device 820 and RAM 810 may also store one or more applications/programs 830. In particular, the storage device 820 and RAM 810 may store an application/program 830 for providing a variety of functionalities to a user. For instance, the application/program 830 may comprise many types of programs such as a word processing application, a spreadsheet application, a desktop publishing application, a database application, a gaming application, internet browsing application, electronic mail application, messaging application, and the like. According to an embodiment of the present invention, the application/program 830 comprises a multiple functionality software application for providing word processing functionality, slide presentation functionality, spreadsheet functionality, database functionality and the like.

The computer 800 in some embodiments can include a variety of sensors 865 for monitoring the environment surrounding and the environment internal to the computer 800. These sensors 865 can include a Global Positioning System (GPS) sensor, a photosensitive sensor, a gyroscope, a magnetometer, thermometer, a proximity sensor, an accelerometer, a microphone, biometric sensor, barometer, humidity sensor, radiation sensor, or any other suitable sensor.

REFERENCES

The following publications are each hereby incorporated herein by reference in their entirety:

E. Basar, M. Di Renzo, J. De Rosny, M. Debbah, M.-S. Alouini, and R. Zhang, "Wireless communications through reconfigurable intelligent surfaces," IEEE access, vol. 7, pp. 116753-116773, 2019.

C. Pan, H. Ren, K. Wang, J. F. Kolb, M. Elkashlan, M. Chen, M. Di Renzo, Y. Hao, J. Wang, A. L. Swindlehurst et al., "Reconfigurable intelligent surfaces for 6 g systems: Principles, applications, and research directions," IEEE Communications Magazine, vol. 59, no. 6, pp. 14-20, 2021.

M. D. Renzo, M. Debbah, D.-T. Phan-Huy, A. Zappone, M.-S. Alouini, C. Yuen, V. Sciancalepore, G. C. Alexandropoulos, J. Hoydis, H. Gacanin et al., "Smart radio environments empowered by reconfigurable ai meta-surfaces: An idea whose time has come," EURASIP Journal on Wireless Communications and Networking, vol. 2019, no. 1, pp. 1-20, 2019.

M. Di Renzo, A. Zappone, M. Debbah, M.-S. Alouini, C. Yuen, J. De Rosny, and S. Tretyakov, "Smart radio environments empowered by reconfigurable intelligent surfaces: How it works, state of research, and the road ahead," IEEE journal on selected areas in communications, vol. 38, no. 11, pp. 2450-2525, 2020.

Q. Wu, S. Zhang, B. Zheng, C. You, and R. Zhang, "Intelligent reflecting surface-aided wireless communications: A tutorial," IEEE Transactions on Communications, vol. 69, no. 5, pp. 3313-3351, 2021.

E. Bjornson, "O." Ozdogan, and E. G. Larsson, "Intelligent reflecting" surface versus decode-and-forward: How large surfaces are needed to beat relaying?" IEEE Wireless Communications Letters, vol. 9, no. 2, pp. 244-248, 2019.

N. Kaina, M. Dupre, G. Lerosey, and M. Fink, "Shaping complex microwave fields in reverberating media with binary tunable metasurfaces," Scientific reports, vol. 4, no. 1, pp. 1-8, 2014.

P. Zivuku, S. Kisseleff, V.-D. Nguyen, K. Ntontin, W. A. Martins, S. Chatzinotas, and B. Ottersten, "Maximizing the number of served users in a smart city using reconfigurable intelligent surfaces," in 2022 IEEE Wireless Communications and Networking Conference (WCNC). IEEE, 2022, pp. 494-499.

M. F. Imani, S. Abadal, and P. Del Hougne, "Metasurface-programmable wireless network-on-chip," Advanced Science, vol. 9, no. 26, p. 2201458, 2022.

A. Araghi, M. Khalily, M. Safaei, A. Bagheri, V. Singh, F. Wang, and R. Tafazolli, "Reconfigurable intelligent surface (RIS) in the sub-6 gHz band: Design, implementation, and real-world demonstration," IEEE Access, vol. 10, pp. 2646-2655, 2022.

M. A. ElMossallamy, H. Zhang, L. Song, K. G. Seddik, Z. Han, and G. Y. Li, "Reconfigurable intelligent surfaces for wireless communications: Principles, challenges, and opportunities," IEEE Transactions on Cognitive Communications and Networking, vol. 6, no. 3, pp. 990-1002, 2020.

H. Zhang, N. Shlezinger, F. Guidi, D. Dardari, M. F. Imani, and Y. C. Eldar, "Beam focusing for near-field multi-user mimo communications," IEEE Transactions on Wireless Communications, 2022.

P. Del Hougne, M. Fink, and G. Lerosey, "Optimally diverse communication channels in disordered environments with tuned randomness," Nature Electronics, vol. 2, no. 1, pp. 36-41, 2019.

G. Lerosey and M. Fink, "Wavefront shaping for wireless communications in complex media: From time reversal to reconfigurable intelligent surfaces," Proceedings of the IEEE, vol. 110, no. 9, pp. 1210-1226, 2022.

J.-B. Gros, V. Popov, M. A. Odit, V. Lenets, and G. Lerosey, "A reconfigurable intelligent surface at mmwave based on a binary phase tunable metasurface," IEEE Open Journal of the Communications Society, vol. 2, pp. 1055-1064, 2021.

G. C. Trichopoulos, P. Theofanopoulos, B. Kashyap, A. Shekhawat, A. Modi, T. Osman, S. Kumar, A. Sengar, A. Chang, and A. Alkhateeb, "Design and evaluation of reconfigurable intelligent surfaces in realworld environment," IEEE Open Journal of the Communications Society, vol. 3, pp. 462-474, 2022.

Z.-Q. He and X. Yuan, "Cascaded channel estimation for large intelligent metasurface assisted massive mimo," IEEE Wireless Communications Letters, vol. 9, no. 2, pp. 210-214, 2019.

L. Wei, C. Huang, Q. Guo, Z. Yang, Z. Zhang, G. C. Alexandropoulos, M. Debbah, and C. Yuen, "Joint channel estimation and signal recovery for ris-empowered multi-user communications," IEEE Transactions on Communications, 2022.

Q. Ma, Q. R. Hong, X. X. Gao, H. B. Jing, C. Liu, G. D. Bai, Q. Cheng, and T. J. Cui, "Smart sensing metasurface with self-defined functions in dual polarizations," Nanophotonics, vol. 9, no. 10, pp. 3271-3278, 2020.

C. Liaskos, G. Pyrialakos, A. Pitilakis, S. Abadal, A. Tsioliaridou, A. Tasolamprou, O. Tsilipakos, N. Kantartzis, S. Ioannidis, E. Alarcon et al., "Absense: Sensing electromagnetic waves on metasurfaces via ambient compilation of full absorption," in Proceedings of the Sixth Annual ACM International Conference on Nanoscale Computing and Communication, 2019, pp. 1-6.

J. Y. Dai, W. Tang, M. Wang, M. Z. Chen, Q. Cheng, S. Jin, T. J. Cui, and C. H. Chan, "Simultaneous in-situ direction finding and field manipulation based on space-time-coding digital metasurface," IEEE Transactions on Antennas and Propagation, 2022.

Q. Y. Zhou, J. W. Wu, S. R. Wang, Z. Q. Fang, L. J. Wu, J. C. Ke, J. Y. Dai, T. J. Cui, and Q. Cheng, "Two-dimensional direction-of-arrival estimation based on time-domain-coding digital metasurface," Applied Physics Letters, vol. 121, no. 18, p. 181702, 2022.

I. Alamzadeh, G. C. Alexandropoulos, N. Shlezinger, and M. F. Imani, "A reconfigurable intelligent surface with integrated sensing capability," Scientific reports, vol. 11, no. 1, pp. 1-10, 2021.

G. C. Alexandropoulos, N. Shlezinger, I. Alamzadeh, M. F. Imani, H. Zhang, and Y. C. Eldar, "Hybrid reconfigurable intelligent metasurfaces: Enabling simultaneous tunable reflections and sensing for 6 g wireless communications," arXiv preprint arXiv: 2104.04690, 2021.

H. Zhang, N. Shlezinger, G. C. Alexandropoulos, I. Alamzadeh, M. F. Imani, and Y. C. Eldar, "Channel estimation with hybrid reconfigurable intelligent metasurfaces," arXiv preprint arXiv: 2206.03913, 2022.

J. He, A. Fakhreddine, and G. C. Alexandropoulos, "Joint channel and direction estimation for ground-to-uav communications enabled by a simultaneous reflecting and sensing ris," arXiv preprint arXiv: 2210.15238, 2022.

R. Ghazalian, H. Chen, G. C. Alexandropoulos, G. Seco-Granados, H. Wymeersch, and R. Jantti, "Joint user localization and location" calibration of a hybrid reconfigurable intelligent surface," arXiv preprint arXiv: 2210.10150, 2022.

I. Alamzadeh and M. F. Imani, "Sensing and reconfigurable reflection of electromagnetic waves from a metasurface with sparse sensing elements," IEEE Access, vol. 10, pp. 105954-105965, 2022.

J. Laviada, A. Arboleya-Arboleya, Y. Alvarez-Lopez, C. GarciaGonzalez, and F. Las-Heras, "Phaseless synthetic aperture radar with efficient sampling for broadband near-field imaging: Theory and validation," IEEE Transactions on Antennas and Propagation, vol. 63, no. 2, pp. 573-584, 2014.

O. Yurduseven, T. Fromenteze, D. L. Marks, J. N. Gollub, and D. R. Smith, "Frequency-diverse computational microwave phaseless imaging," IEEE Antennas and Wireless Propagation Letters, vol. 16, pp. 2808-2811, 2017.

A. V. Diebold, M. F. Imani, T. Sleasman, and D. R. Smith, "Phaseless coherent and incoherent microwave ghost imaging with dynamic metasurface apertures," Optica, vol. 5, no. 12, pp. 1529-1541, 2018.

A. V. Diebold, M. F. Imani, T. Sleasman, and D. R. Smith, "Phaseless computational ghost imaging at microwave frequencies using a dynamic metasurface aperture," Appl. Opt., vol. 57, no. 9, pp. 2142-2149 March 2018.

D. Sievenpiper, L. Zhang, R. F. Broas, N. G. Alexopolous, and E. Yablonovitch, "High-impedance electromagnetic surfaces with a forbidden frequency band," IEEE Transactions on Microwave Theory and techniques, vol. 47, no. 11, pp. 2059-2074, 1999.

E. J. Candes, X. Li, and M. Soltanolkotabi, "Phase retrieval via wirtinger flow: Theory and algorithms," IEEE Transactions on Information Theory, vol. 61, no. 4, pp. 1985-2007, 2015.

B. Fuchs and L. Le Coq, "Excitation retrieval of microwave linear arrays from phaseless far-field data," IEEE Transactions on Antennas and Propagation, vol. 63, no. 2, pp. 748-754, 2014.
P. D. Hougne, M. F. Imani, A. V. Diebold, R. Horstmeyer, and D. R. Smith, "Learned integrated sensing pipeline: Reconfigurable metasurface transceivers as trainable physical layer in an artificial neural network," Adv. Sci., vol. 7, no. 3, 2020, Art. no. 1901913.
N. Viswanathan, S. Venkatesh, and D. Schurig, "Optimization of a sparse aperture configuration for millimeter-wave computational imaging," IEEE Trans. Antennas Propag., vol. 69, no. 2, pp. 1107-1117 February 2021.
T. Fromenteze, O. Yurduseven, P. D. Hougne, and D. R. Smith, "Lowering latency and processing burden in computational imaging through dimensionality reduction of the sensing matrix," Sci. Rep., vol. 11, no. 1, 2021, Art. no. 3545.
I. Alamzadeh and M. F. Imani, "Detecting Angle of Arrival on a Hybrid RIS Using Intensity-Only Data," in IEEE Antennas and Wireless Propagation Letters, vol. 22, no. 9, pp. 2325-2329 September 2023, doi: 10.1109/LAWP.2023.3288123.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention.

What is claimed is:

1. A system for detecting angle of arrival, comprising:

an array of first and second meta-atoms comprising metamaterial or resonant elements that share a dielectric substrate and a metallic ground layer, wherein each of the metamaterial or resonant elements includes a switchable component, and wherein the first meta-atoms differ from the second meta-atoms;

an opening in the ground layer configured to couple an incident wave signal; and a waveguide below the ground layer configured to guide the coupled signal to a receiving circuit comprising an intensity or power meter configured to detect the angle of arrival solely based on a measured intensity or power.

2. The system of claim 1, further comprising a computing system communicatively connected to the receiving circuit and the array of metamaterial or resonant elements, comprising a processor and a non-transitory computer-readable medium with instructions stored thereon, which when executed by the processor, perform steps comprising: receiving a measured intensity or power of the coupled signal from the receiving circuit; and calculating an angle of arrival based on the measured intensity or power.

3. The system of claim 2, wherein the computing system is further communicatively connected to the array of metamaterial or resonant elements, and wherein the processor is configured to perform steps stored on the computer-readable medium comprising addressing the array of metamaterial or resonant elements.

4. The system of claim 1, wherein the system is configured as a reconfigurable intelligent surface (RIS), wherein the first meta-atoms comprise an RIS array and the second meta-atoms comprise two hybrid meta-atoms within the RIS array.

5. The system of claim 1, wherein the switchable component is configured to be addressed independently and configured to change its effective response.

6. The system of claim 1, wherein the waveguide comprises a substrate integrated waveguide.

7. The system of claim 1, wherein the switchable components comprise at least one of varactor diodes, PIN diodes, Schottky diodes, transistors, MEMS switches, phase change materials, liquid crystals.

8. The system of claim 1, wherein the system is configured to operate over a narrowband or single frequency.

9. A method for detecting angle of arrival, comprising:

providing the system of claim 1;

coupling an incident wave signal to the shared substrate;

guiding the coupled signal from the shared substrate to the receiving circuit via the waveguide;

measuring the coupled signal via the intensity or power meter of the receiving circuit; and calculating an angle of arrival based on the measured intensity or power.

10. The method of claim 9, wherein the incident wave is coupled from the shared substrate via an opening inside the ground layer to the waveguide.

11. The method of claim 9, further comprising addressing the metamaterial or resonant elements of the array to exhibit a random response.

12. The method of claim 9, wherein the coupled signal comprises a randomly multiplexed version of the incident signal.

13. The method of claim 9, further comprising applying one or more multiplexing weights to the array of metamaterial or resonant elements.

14. The method of claim 13, wherein the one or more multiplexing weights are applied via setting the switchable components randomly.

15. The method of claim 13, wherein a multiplexing weight comprises a mask.

16. The method of claim 15, wherein the mask comprises a binary mask configured to switch each switchable element to one of two different capacitive states.

17. The method of claim 9, wherein a plurality of measurements of the coupled signal are performed before any substantial change to the environment occurs.

18. A method to detect angle of arrival via intensity only data, comprising:

applying a randomized mask to a reconfigurable intelligent surface;

receiving an incident wave signal on the reconfigurable intelligent surface, wherein the received signal is weighted based on the applied randomized mask;

measuring an intensity of the weighted signal using an intensity or power meter; and calculating an angle of arrival based solely on the measured intensity.

19. The method of claim 18, wherein the randomized mask is applied to the reconfigurable intelligent surface via setting a plurality of switchable components of the reconfigurable intelligent surface.

20. The method of claim 19, wherein the randomized mask comprises a binary mask where each switchable element is set to one of two different capacitive states.

* * * * *